(12) United States Patent
Hristov

(10) Patent No.: US 10,296,299 B2
(45) Date of Patent: May 21, 2019

(54) SERVER-SIDE WEAVING OF APPLICATION-ORIENTED-PROGRAMMING ADVICE INTO COMPUTER CODE THAT PREEMPTS CLIENT-SIDE LOAD-TIME WEAVING

(71) Applicant: VMware, Inc., Palo Alto, CA (US)

(72) Inventor: Rostislav Hristov, Sofia (BG)

(73) Assignee: VMware, Inc., Palo Alto, CA (US)

(*) Notice: Subject to any disclaimer, the term of this patent is extended or adjusted under 35 U.S.C. 154(b) by 886 days.

(21) Appl. No.: 13/722,095

(22) Filed: Dec. 20, 2012

(65) Prior Publication Data

US 2014/0181787 A1    Jun. 26, 2014

(51) Int. Cl.
*G06F 8/30* (2018.01)
*G06F 11/34* (2006.01)

(52) U.S. Cl.
CPC .......... *G06F 8/316* (2013.01); *G06F 11/3466* (2013.01); *G06F 11/3495* (2013.01); *G06F 2201/815* (2013.01); *G06F 2201/865* (2013.01)

(58) Field of Classification Search
USPC ....................................................... 717/106
See application file for complete search history.

(56) References Cited

U.S. PATENT DOCUMENTS

| | | | |
|---|---|---|---|
| 6,260,078 B1* | 7/2001 | Fowlow | G06F 9/548 717/118 |
| 2006/0101092 A1* | 5/2006 | Ishida et al. | 707/203 |
| 2006/0288106 A1* | 12/2006 | Kumar et al. | 709/227 |
| 2008/0168422 A1* | 7/2008 | Cheng et al. | 717/114 |
| 2009/0300138 A1* | 12/2009 | Schneider | 709/217 |

OTHER PUBLICATIONS

Washizaki et al. "AOJS: Aspect-oriented JavaScript programming framework for Web development." Proceedings of the 8th workshop on Aspects, components, and patterns for infrastructure software. ACM, 2009.*

* cited by examiner

*Primary Examiner* — Li B. Zhen
*Assistant Examiner* — Joanne G Macasiano

(57) ABSTRACT

The current application is directed to implementation of crosscutting functionalities, including code instrumentation, error logging, performance monitoring and performance-data logging, and other such crosscutting functionalities. These crosscutting functionalities generally violate, or run counter to, modem code-development strategies and programming-language features that seek to partition logic into hierarchically organized compartments and modules with related functionalities, attribute values, and other common features. In current client/server environments, for certain types of programs distributed by a server to client computers, including programs embedded in files that specify web pages, cross-cutting functionality is encoded in advice included with the programs and distributed to the client computers, which weave the advice into programs prior to or during client-side interpretation of the programs. The current application is directed to methods and systems that replace client-side weaving of advice into programs by weaving of the advice into the programs by the server computer prior to distribution of the program to the client.

12 Claims, 17 Drawing Sheets

SERVER-SIDE WEAVING OF APPLICATION-ORIENTED-PROGRAMMING ADVICE INTO COMPUTER CODE THAT PREEMPTS CLIENT-SIDE LOAD-TIME WEAVING

TECHNICAL FIELD

The current application is directed to design and implementation of control logic and computer programs and, in particular, to methods and systems for introducing crosscutting functionality into computer code exported from a server computer to client computers.

BACKGROUND

Instrumentation of computer code has been used, for many years, during development, analysis, optimization, and debugging of various types of computer programs, including operating-system code, virtual-machine code, various types of system routines and facilities, and application programs. By introducing instrumentation into computer code, various types of data can be collected from an executing system or program, including timing data, resource-utilization data, error-log data, and sequential or tree-like data representations of the code paths traversed by executing systems, programs, and routines.

Comprehensive instrumentation, unfortunately, does not well fit within many code-development paradigms. Many code-development strategies and programming-language features are directed to compartmentalizing functionality and logically organizing code into hierarchical modules, objects, and other constructs. In general, however, instrumentation and related tasks, including error logging and error handling, involve insertion of specialized functionality across objects, modules, and other such compartmentalized entities.

During the past decade, tools for facilitating code instrumentation and related tasks have been developed under the category of aspect-oriented programming ("AOP") tools and facilities. AOP provides tools for implementing crosscutting functionalities, such as instrumentation of code for analytics and logging errors, within the object-oriented-programming paradigm and other such development strategies. Crosscutting functionalities are functionalities that cut across the various code-development strategies and paradigms, such as object-oriented programming and earlier top-down programming that seek to logically organize code into functionality-related compartments and hierarchies. While AOP has addressed many of the problems associated with implementation of crosscutting tasks and facilities, certain challenges to implementing cross-cutting functionalities remain. For this reason, designers, developers, manufacturers and vendors, and, ultimately, users of a wide variety of different types of computer-instruction-encoded control components to modern computational systems, from processor-controlled appliances and cell phones to high-end distributed computational facilities, continue to seek additional tools and strategies for implementation of crosscutting functionalities, including code instrumentation.

SUMMARY

The current application is directed to implementation of crosscutting functionalities, including code instrumentation, error logging, performance monitoring and performance-data logging, and other such crosscutting functionalities. These crosscutting functionalities generally violate, or run counter to, modern code-development strategies and programming-language features that seek to partition logic into hierarchically organized compartments and modules with related functionalities, attribute values, and other common features. In current client/server environments, for certain types of programs distributed by a server to client computers, including programs embedded in files that specify web pages, cross-cutting functionality is encoded in advice included with the programs and distributed to the client computers, which weave the advice into programs prior to or during client-side interpretation of the programs. The current application is directed to methods and systems that replace client-side weaving of advice into programs by weaving of the advice into the programs by the server computer prior to distribution of the program to the client.

DETAILED DESCRIPTION

It should be noted, at the onset, that the current application is directed to implemented functionalities, and systems containing the implemented functionalities, that are real, tangible, physical subcomponents of physical devices and systems. Those familiar with science and technology well understand that much of the control logic incorporated within modern devices, machines, and systems is implemented as large sets of processor instructions that are physically stored in memories, mass-storage devices, and removable storage media and that must necessarily be so physically embodied in order to be accessed by processors and other computer machinery for execution. Physically embodied processor instructions are no less physical, tangible, and real than power supplies, processors, component housings, electronic memories, internal and external communications hardware, and other such components of modern devices, machines, and systems.

Figure 1:
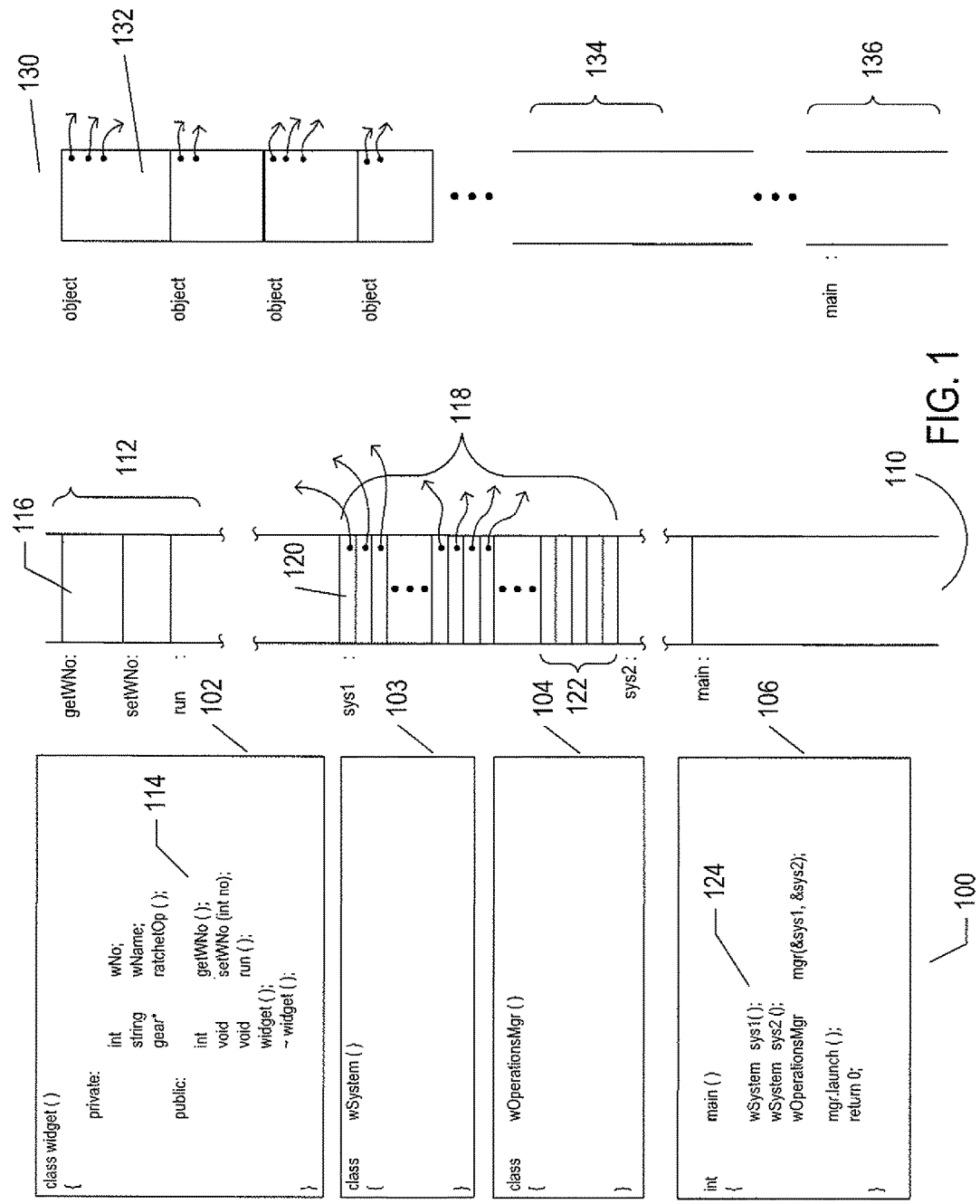
FIG. 1 illustrates a symbolically encoded computer program and a corresponding physical, in-memory implementation of the computer program.

FIG. 1 illustrates a symbolically encoded computer program and a corresponding physical, in-memory implementation of the computer program. A symbolically encoded computer program 100 may include a symbolic encoding of a number of different classes 102-104 and a main routine 106 that together specify a set of instructions that are stored in memory for execution by one or more processors within a processor-controlled device, machine, or system. In many modern programming environments, objects instantiated during execution of a computer program correspond to symbolically encoded classes. In FIG. 1, a virtual address space 110 composed, in general, of instruction-storage and data-storage faculties provided as physical address spaces both by one or more electronic memories and one or more non-volatile mass-storage devices, is shown as a column, according to conventional illustration techniques. The function members of classes are generally compiled into sets of sequentially organized processor instructions that reside in one portion of memory 112. For example, the function member "getWNo" 114 of the widget class 102 is compiled into a set of instructions represented by block 116 associated with a symbolic entry point or initial memory address. An object may be instantiated for a class by allocating and configuring a portion of the address space, such as address-space portion 118, to include references to entry points corresponding to member functions of the object as well as memory locations for object data members and/or references to object data members. For example, the instantiated object 118 is instantiated from the wSystem class 103 and contains references, such as reference 120, to entry points of function members of the object as well as storage locations 122 in memory for storing the values of object data members and references to data members located elsewhere in memory. This particular object, sys1, is instantiated in an initial line 124 of the main routine 106.

The in-memory implementation of the symbolically encoded program, shown in FIG. 1, is relatively simplistic. In actual devices, machines, and systems, the mappings from symbolic encodings of computer programs to a virtual address space that represents various different electronic memories and storage space within mass-storage devices may be complex. FIG. 1 also shows, in a right-hand column 130, a simplified representation of the in-memory implementation of the symbolically encoded computer program 100 as a set of in-memory resident object instantiations, such as object instantiation 132, a region of processor instructions corresponding to routines called from object instantiations 134, and processor instructions stored within memory that represent the main routine 136. The memory of a functioning processor-controlled device also includes large numbers of operating-system routines, library code, and many other types of control functionalities implemented as stored processor instructions that provide computational facilities and an execution environment for computer programs.

Figure 2:
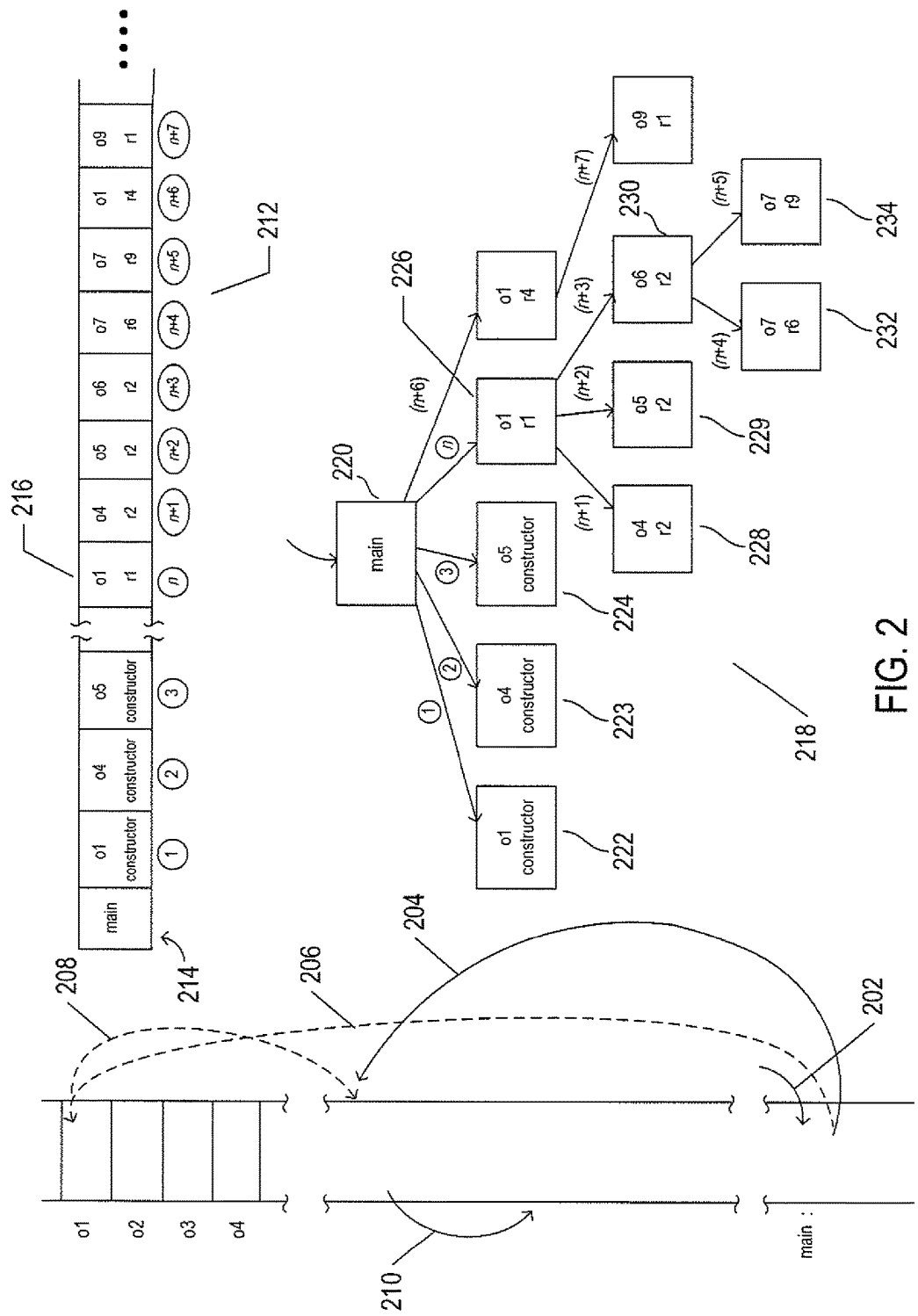
FIG. 2 illustrates program execution and collection of data via instrumentation.

FIG. 2 illustrates program execution and collection of data via instrumentation. When execution of a program is launched, the program generally begins execution at the first instruction of the main routine, as represented by arrow 202 in FIG. 2. As main instructions are sequentially executed, an instruction representing a call to a routine is generally encountered, with execution control passing to a portion of memory that contains instructions for the routine, as represented by arrow 204 in FIG. 2. When the routine is a member function of an instantiated object, the routine call involves accessing a virtual table for the object that contains function-member references, represented by dashed arrow 206 in FIG. 2, and following the reference to appropriate routine code, represented by dashed arrow 208 in FIG. 2. As the called routine begins to execute, the called routine often calls yet an additional routine, represented by arrow 210 in FIG. 2.

There are a variety of different types of instrumentation that may be included in an implementation of a symbolically encoded computer program. One type of instrumentation collects data at the beginning of execution and end of execution of each routine. The data collected from this type of instrumentation may form a sequence of data frames 212, each frame of the sequence representing one call to a routine. For example, in FIG. 2, a first frame 214 of the sequence corresponds to the initial call of the main routine and the next frame 216 of the sequence of data frames 212 corresponds to a call of a constructor member function associated with instantiated objected o1. Each data frame contains a variety of different types of information useful for subsequent analysis of program execution. A data frame may include time stamps, values of various machine-state variables, time-stamped indications of calls to system routines, and many other types of information that can be used, during analysis, to understand various aspects of program execution. For example, using a sequence of data frames produced by an executed program, an execution-analysis tool can determine the amount of time and/or number of processing cycles used by each routine in order to identify computationally expensive routines that might be good candidates for application of various optimization methods used to improve efficiency of execution of the program. Similarly, instrumentation may be included in the program to log errors that occur during execution of the program and to collect a myriad of different additional types of information may be used to understand and characterize the execution behavior of the computer program. Often, a sequence of data frames, such as the sequence of data frames 212 shown in FIG. 2, may be hierarchically organized for display 218. Levels of the hierarchy indicate the depth of nested routine calls during execution of the program. For example, the initially called main routine 220 may successively call constructors for a number of objects 222-224 and then call a routine "r1" of a first object 226 which calls various additional routines 228-230, one of which calls yet additional routines 232 and 234. Both the sequential organization of data frames and hierarchically organized data frames generated from data collected by instrumentation, referred to as execution traces," are familiar to computer scientists and engineers.

Initially, program developers would include explicit calls to instrumentation routines within program routines in order to instrument the program routines. For many reasons, this practice runs counter to modern computer-code-development strategies. Insertion of instrumentation is time consuming, expensive, and error prone, and altering behavior of instrumentation code may involve many different changes and general recompilation of program code. For example, it may be the case that, rather than saving a complete list of data frames generated by each routine called during execution of a program, which, for even a modestly sized program, may run into millions, tens of millions, or more data frames, an analyst may instead wish to either randomly generate a sparse set of data frames, to decrease the amount of data storage necessary but to still provide a sufficient amount of information about the execution of a program for analysis purposes, or may instead wish to aggregate the data frames during data collection. As one example, it may be the case that the analyst is not concerned with collecting individual information for lower-level routines within a trace hierarchy, but instead prefers to aggregate elapsed time, processing cycles, and other characteristics of the lower-level frames into higher-level frames. For example, referring to FIG. 2, instead of storing frames 226, 230, 232, and 234 generated as a result of the call by the main program to the routine "r1" of a first instantiated object, the analyst may prefer to aggregate all of the information contained in these four nodes in a single node 226 corresponding to the routine call. Modifying instrumentation included in each routine in order to accomplish such goals involves time-consuming, expensive, and potentially error-prone programming.

Figure 3:
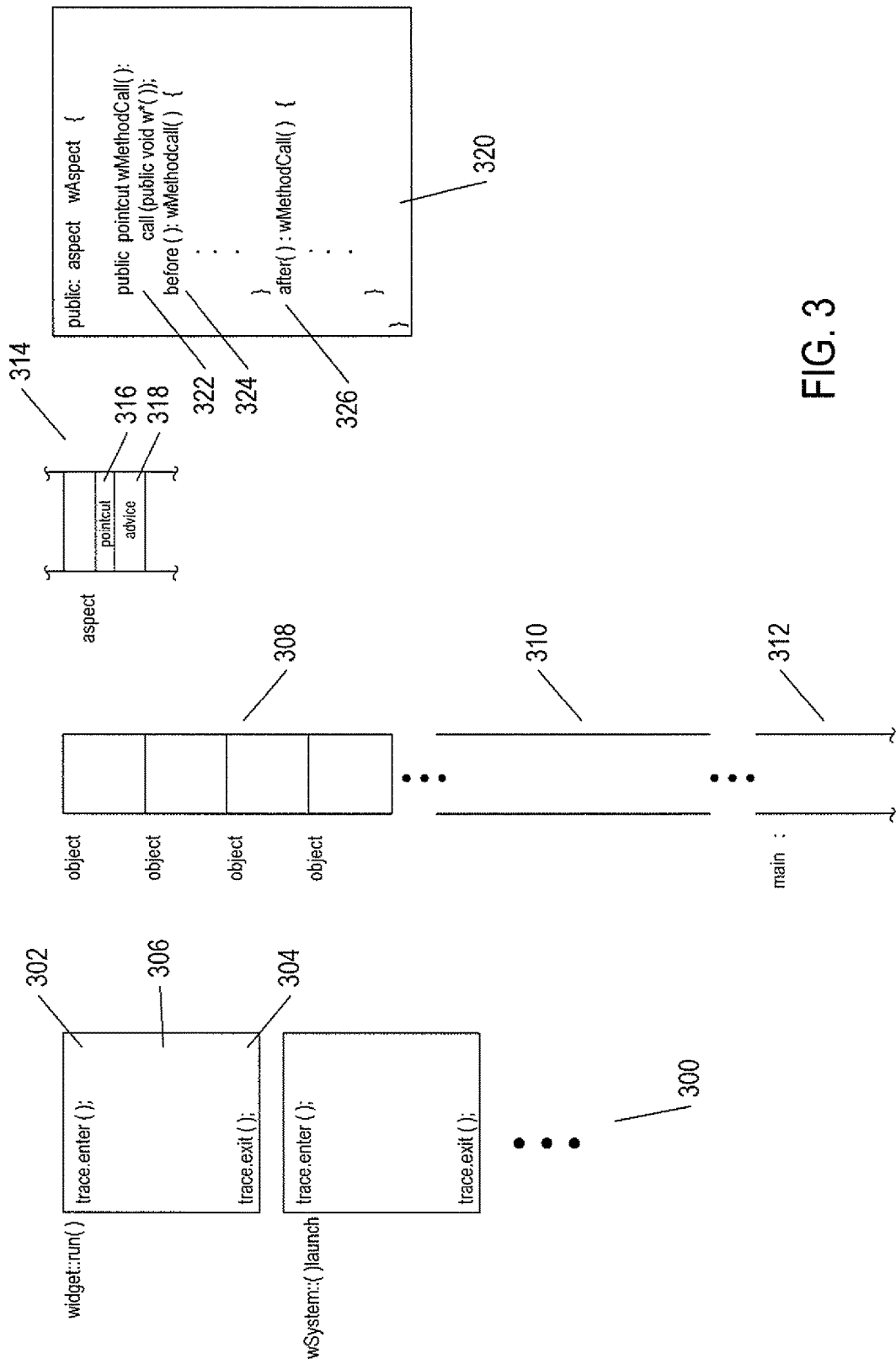
FIG. 3 illustrates the aspect-oriented-programming ("AOP") approach to implementing crosscutting functionality.

FIG. 3 illustrates the aspect-oriented-programming ("AOP") approach to implementing crosscutting functionality. In the left column of FIG. 3 300, the manual instrumentation of routines is illustrated. In this case, in order to generate a trace of data frames, as discussed above with reference to FIG. 2, a program developer has introduced routine calls to a trace object at the beginning 302 and end 304 of each routine, such as routine 306. As discussed above, this technique is expensive in time, error-prone, relatively inflexible, and contrary to modern program-development strategies, including object-oriented programming.

During the past decade, AOP techniques and facilities have been developed. In one AOP approach, in addition to object instantiations 308, routines 310, and a main program 312, an in-memory implementation of the program may additionally include one or more aspects 314, each aspect including a pointcut definition 316 and executable code 318, referred to as "advice," that is inserted at those points during program execution identified by the pointcut. FIG. 3 shows a symbolic encoding of a simple aspect 320, in which the pointcut definition 322 identifies various routines into which advice should be inserted and the "before" and "after" routines 324 and 326 specify advice code to be executed prior to and following execution of the routines identified by the pointcut during program execution. Of course, there are many different programming-language syntaxes and facilities that can be used to define aspects, the example shown in FIG. 3 is intended only to illustrate the fact that aspects can be symbolically encoded, rather than provide an example of how the encoding is carried out. Aspects thus provide an elegant tool for introducing crosscutting facilities into a computer program. Rather than introducing routine calls in each routine, as in the symbolic code 300 shown on the left side of FIG. 3, a programmer need only develop an appropriate aspect for the program, and the desired crosscutting functionality is automatically included prior to program execution. As discussed further, below, the aspect may be initially compiled to bytecode, and advice then inserted into executable code during final interpretation and/or compilation of bytecode by a virtual machine, in certain systems.

Figure 4:
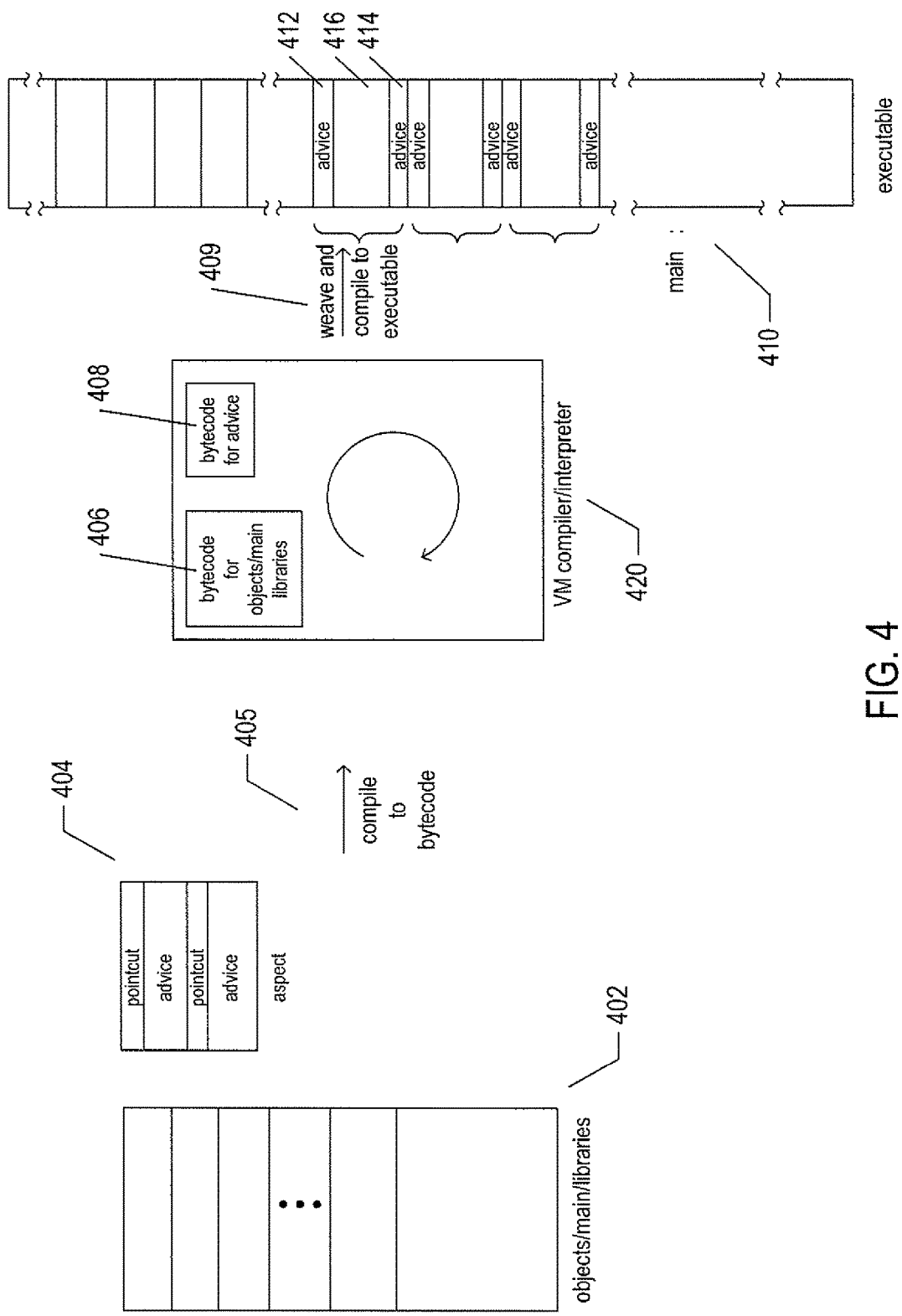
FIG. 4 illustrates one method by which AOP-defined instrumentation is included during program execution.

FIG. 4 illustrates one method by which AOP-defined instrumentation is included during program execution. In certain modern programming languages, such as Java, symbolically encoded program code is initially compiled to intermediate byte code, also referred to as "byte code" and "intermediate code," which is then interpreted and/or compiled by a virtual machine into executable code for execution on particular devices, machines, and systems. As shown in FIG. 4, a program, including class declarations and implementations and a main program, in addition to various libraries and system code 402 and an aspect 404, which includes one or more pointcuts and associated advice, are separately compiled 405 into byte code for the program 406 and byte code for the aspect advice 408. A virtual machine then generates, from these two sets of byte code and pointcut information, an executable 410 or portions of executable code stored in an address space. The process 409 by which the program byte code and aspect byte code is merged is referred to as "weaving." In the case of an aspect that includes pointcuts that identify points in time, during execution, corresponding to the entering of routines and exiting from routines, a virtual machine introduces the advice corresponding to the pointcuts into the code for those routines selected by the pointcuts, during executable-code generation. For example, as shown in FIG. 4, advice to be executed prior to and following execution of particular routines has been introduced by the virtual machine at the beginning 412 and at the end 414 of particular routines, such as routine 416.

Pointcuts can be used to identify any of various different subsets of points in the execution of a program, referred to as "joinpoints." Joinpoints may include any type of point during the execution of a program that may be defined, including the beginning of execution of routines, immediately following execution of routines, access to particular memory locations, and other such definable points that may arise during the execution of a routine. For example, considering the joinpoints corresponding to the beginning of execution of all routines, which can be defined as points at which routine-call instructions are executed, a pointcut may be used to define a subset of these joinpoints comprising the points in the execution of the program corresponding to routine-call instructions for only a subset of the routines of the program, such as the member functions of a particular class or instantiated object. Thus, aspect definition is quite general, and allows for introduction of functionality at arbitrarily selected defined points during the execution of a program. In the following examples, collection of data frames for trace analysis, as discussed above with reference to FIG. 2, is implemented using an aspect, such as aspect 320 discussed with reference to FIG. 3, which results in introduction of executable trace code immediately prior to and immediately following execution of each of a definable set of routines. However, techniques similar to those discussed below can be used for code inserted at other types of joinpoints.

The compilation that produces the program byte code and advice byte code may be carried out in a server computer, which then distributes the program byte code and advice byte code to a client computer, where the weaving takes place. Alternatively, the advice byte code may be woven into the program byte code by the server computer prior to distribution of a byte code program to client computers.

While the above discussion is directed to incorporating advice into programs that are compiled to executable, the AOP approach may also be extended to programs written in languages, including script languages, that are intended to be distributed by server computers to client computers, where the script programs are interpreted. An interpreter within a virtual machine or web browser running on a client computer may first weave advice into the script and then interpret the script, or may interpret the script and advice into byte code and then weave the byte code prior to interpreting the woven byte code. However, unlike in the case of compiled programs, script advice is woven into script programs on the client side, when a script-containing file is downloaded by the client computer from the server computer since script interpretation is carried out on the client side.

One example of script language is script language, such as JavaScript, that is embedded in hypertext markup language ("HTML") files that specify web pages. The AOP approach may be employed to define advice and pointcuts for scripts and include script aspects with scripts that are embedded in HTML files. The HTML files are distributed by web servers to web browsers running within remote client computers. Currently, a web browser interprets the scripts and associated aspects included in an HTML file received by the web browser from a remote server and weaves the advice into the scripts each time that the web browser requests and receives the HTML in a process referred to as "load-time weaving." While load-time weaving allows the AOP approach to be applied to script files, load-time weaving is quite inefficient. The web browser generally cannot avail itself of local storage, and therefore cannot store woven embedded-script byte code. As a result, the advice needs to be woven into the program during each download and processing of a web-page-specifying HTML file.

Figure 5A:
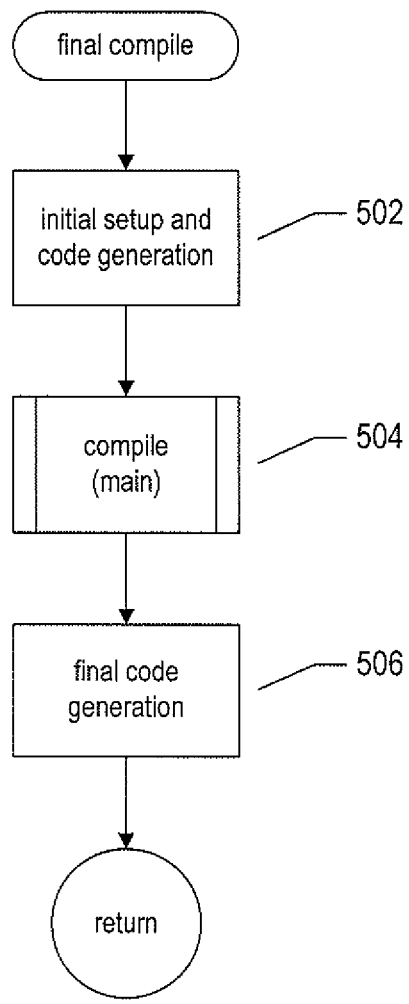
FIGS. 5A-B illustrate the final interpretation or compilation of program byte code and aspect byte code by a virtual machine in a weaving process.
Figure 5B:
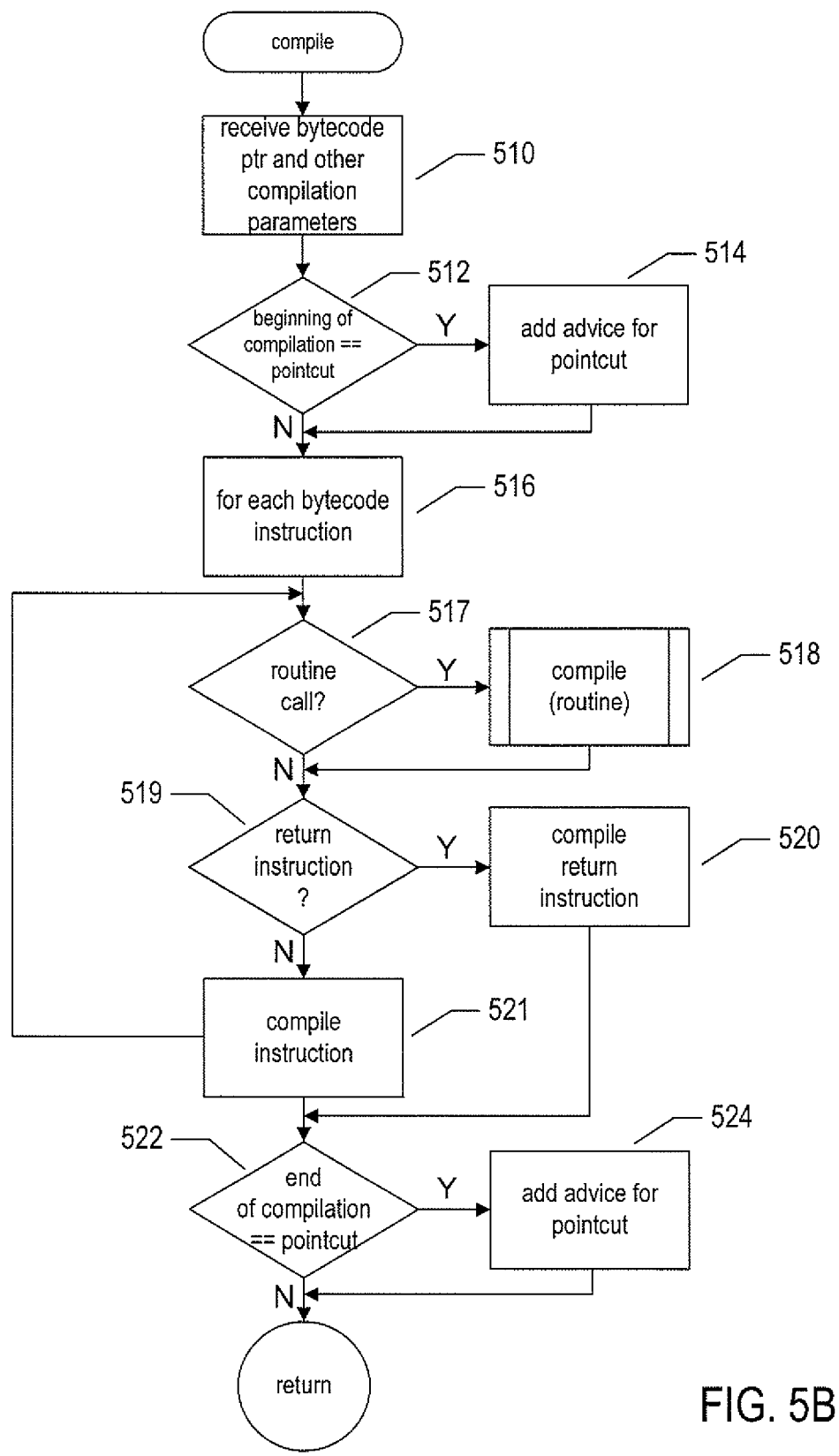

FIGS. 5A-B illustrate the final interpretation or compilation of program byte code and aspect byte code by a virtual machine in a weaving process. FIG. 5A shows a routine "final compile." In a first step 502 of this routine, program and aspect byte code corresponding to a program is received by a virtual machine that carries out any initial setup tasks and initial code generation that precedes generation of executable code corresponding to a program. Then, in step 504, the routine "final compile" calls a routine "compile" to begin generating executable code for the main routine of the program and for routines called from the main routine. Finally, in step 506, the virtual machine carries out any additional code generation and other tasks needed to provide executable code to underlying hardware corresponding to the initially received program and aspect byte code.

FIG. 5B provides a control-flow diagram for the routine "compile" called in step 504 of FIG. 5A. The routine "compile" weaves advice byte code corresponding to pointcuts that bracket routines, such as the "before" and "after" advice routines discussed above with reference to FIG. 3. Such pointcuts are often used in performance monitoring. In step 510, the routine "compile" receives a byte code pointer to the beginning of a routine to compile and any other various compilation parameters. In step 512, the routine "compile" determines whether the current execution point corresponding to the beginning of compilation of a routine corresponds to a point of execution defined by a pointcut within the aspect byte code. When the current point of execution corresponds to a pointcut, any advice corresponding to that pointcut is appended to the byte code for the routine, in step 514. Next, in the for-loop of steps 516-521, the routine "compile" compiles each byte code instruction into executable code. When the instruction is a routine call, as determined in step 517, the routine "compile" is recursively called in step 518. When the next instruction is a return instruction, terminating the routine for which code is currently being generated, code for the return instruction is generated in step 520, terminating the for-loop of steps 516-521. Following generation of code for the return, the routine "compile" determines whether the current point of execution, following execution of the routine, corresponds to a point of execution defined by a pointcut in the aspect, in step 522. When the current point of execution corresponds to a pointcut, code is generated for the advice corresponding to that pointcut in step 524.

Figure 6A:
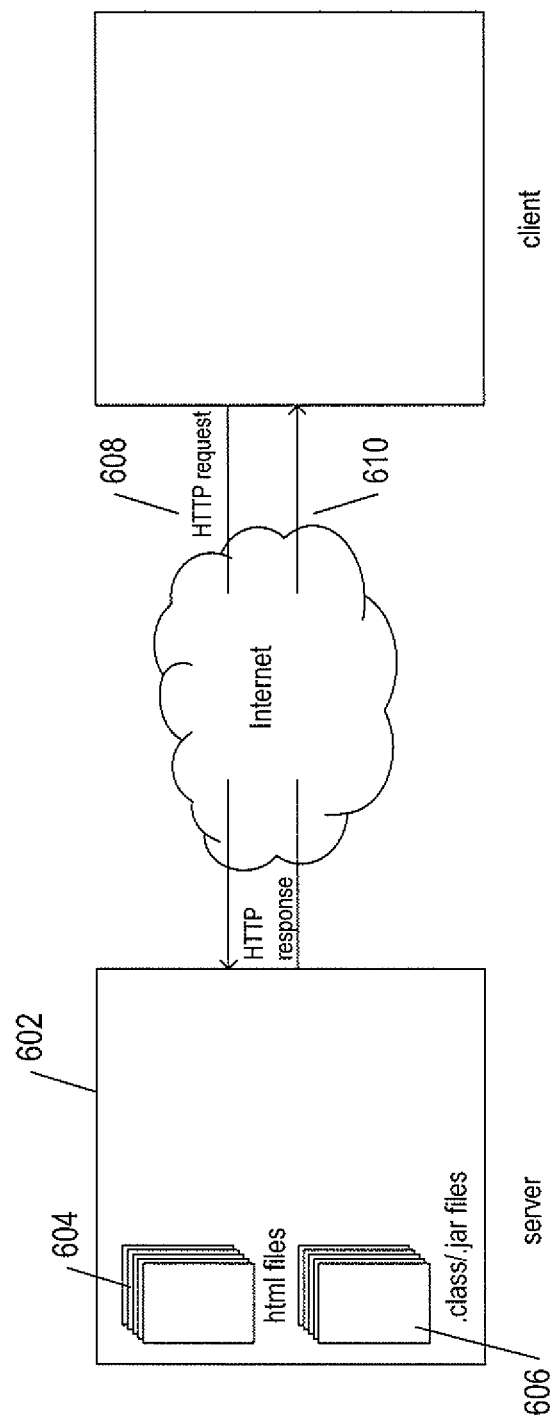
FIGS. 6A-E provide additional details with respect to the transfer of computer instructions from server computers to client computers via the HTTP protocol ("HTTP protocol") and client-computer-resident web browsers.

FIGS. 6A-E provide additional details with respect to the transfer of computer instructions from server computers to client computers via the hypertext transfer protocol ("HTTP protocol") and client-computer-resident web browsers. FIG. 6A is an overview of client/server information exchange. In FIG. 6A, a server computer 602 contains a number of hypertext markup language ("HTML") files 604, or .html files, and a number of .class byte-code files and/or .jar byte-code-archive files 606. In general, the HTML files 604 are associated with a uniform resource locator ("URL") or uniform resource identifier ("URI") which is embedded in web-page descriptions or in other files processed by a client-side web browser. During processing of such files by a web browser, the web browser identifies a URL that the web browser needs to obtain from a remote source, carries out a transaction with a remote domain-name system ("DNS") server to determine the IP address of the server associated with the URL, and then issues an HTTP request 608 for the file corresponding to the URL, in response to which the server locates the file associated with the URL and returns the file in an HTTP response 610. Similarly, within HTML files that specify web pages and that are processed by a web browser to render and display a web page to a user, the web browser may encounter references to files containing byte code, including .class byte-code files and compressed byte-code archives contained in .jar files 606. The client-side web browser then issues an HTTP request 608 for a particular byte-code file to the appropriate server computer which returns the requested byte-code file and HTTP response 610.

Figure 6B:
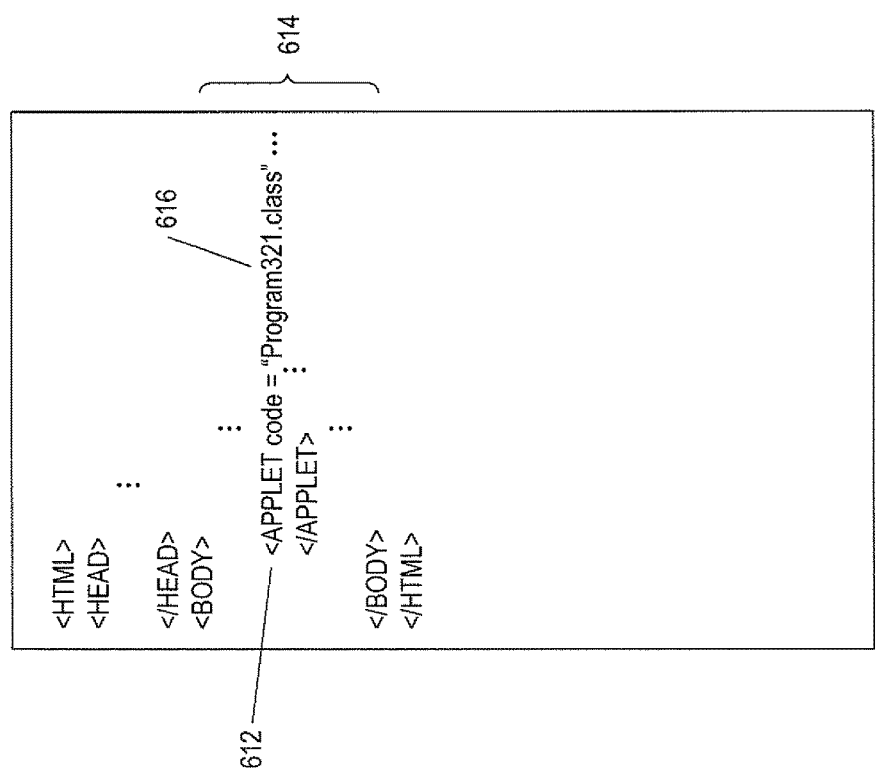

FIG. 6B abstractly illustrates an HTML file that specifies a web page and that includes a reference to executable code which a web browser, during processing of the HTML file, downloads from a server and executes. Such downloaded executable code allows for creation of complex graphics, data acquisition and processing, and complex rendering activities that access the document object model ("DOM") constructed to represent the web page within the web browser and that are programmatically specified rather than statically specified in HTML directives. A file containing the executable code may be specified within a special tag 612 within the body 614 of the HTML specification of a web page. The executable code, in the case shown in FIG. 6B, is included in a .class file named "Program321.class" 616.

Figure 6C:
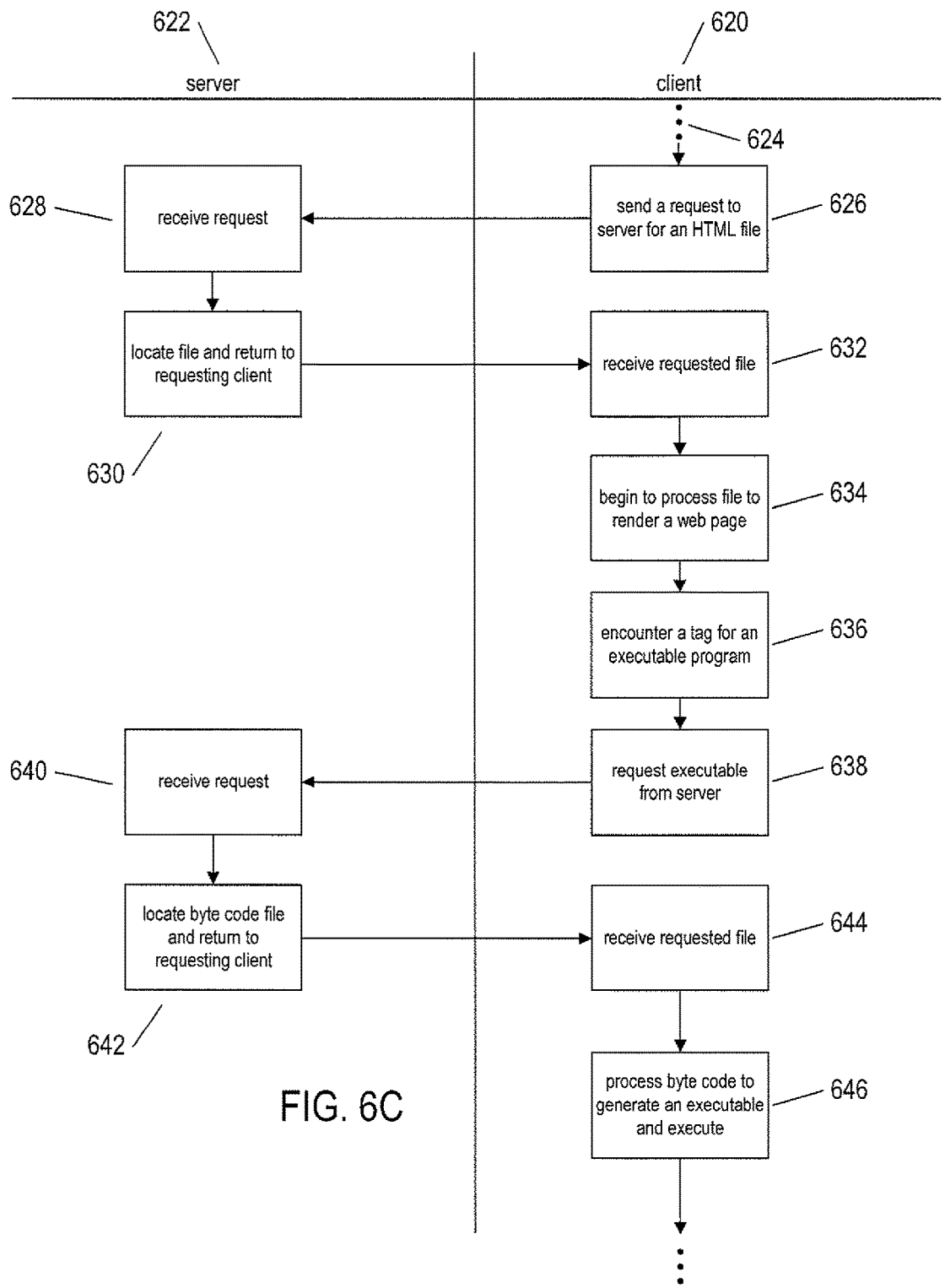

FIG. 6C illustrates processing of the HTML file by a client-side web browser. In FIG. 6C, as in FIG. 6E, described below, a control-flow-like diagram is provided, with client-side operations shown on the right-hand side of the diagram 620 and server-side operations shown on the left-hand side of the diagram 622. As indicated by ellipses 624, the web browser has been launched and is actively processing HTML files on behalf of a user and displaying the rendered HTML files to the user on a display device coupled to the user's client-computer system. In the currently described scenario, the user has input a mouse click to a displayed link within a displayed web page, as a result of which the web browser has determined the IP address of a server from which to request an HTML file corresponding to the displayed link to which the user input a mouse click. In step 626, the client computer sends a request for the HTML file to the server using the HTTP protocol. In step 628, the server receives the request and, in step 630, locates the file and returns the HTML file to the requesting client computer via the HTTP protocol. In step 632, the client receives the requested file and begins processing the file in order to render and display the file to the user as a web page, in step 634, thus carrying out the link-based navigation requested by the user via the mouse click to the displayed link on the previously rendered and displayed web page. In step 636, the web browser encounters a tag that specifies an executable program, such as the tag discussed above with reference to FIG. 6B. In step 638, the web browser requests the executable .class file or .jar file, using the HTTP protocol, from the server in step 638. In step 640, the server receives the request, locates the byte-code-containing file requested by the client-side browser, and returns the byte-code-containing file to the requesting client computer in step 642. In step 644, the client-side web browser receives the requested file via the HTTP protocol and, in step 646, begins processing of the byte code in order to either interpret the byte code or compile the byte code into an executable and execute that executable. The above-described weaving process, in which aspect byte code is woven into program byte code, may be carried out in this processing step, in the case that the program byte code and advice byte code are not woven together on the server.

Figure 6D:
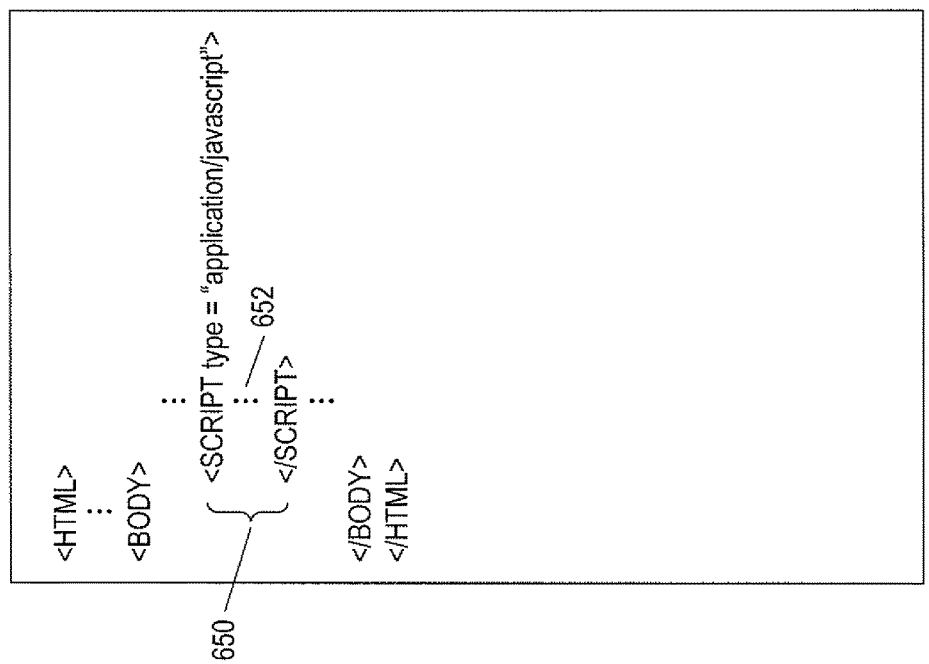

FIG. 6D illustrates a second type of mechanism by which executable code is transferred from a server to a client-side web browser. FIG. 6D abstractly illustrates another web page, using the illustration conventions used in FIG. 6B. In the web page shown in FIG. 6D, a tag 650 within the body of the HTML code specifying a web page includes script-language code. The script-language code is embedded directly within the web page, as represented by ellipses 652, in the section of the HTML file bounded by the script tag. There are many different types of script languages, including the commonly used JavaScript language. Script languages may have a variety of different syntaxes, features, and facilities. JavaScript, for example, borrows many syntax elements from the C programming language.

Figure 6E:
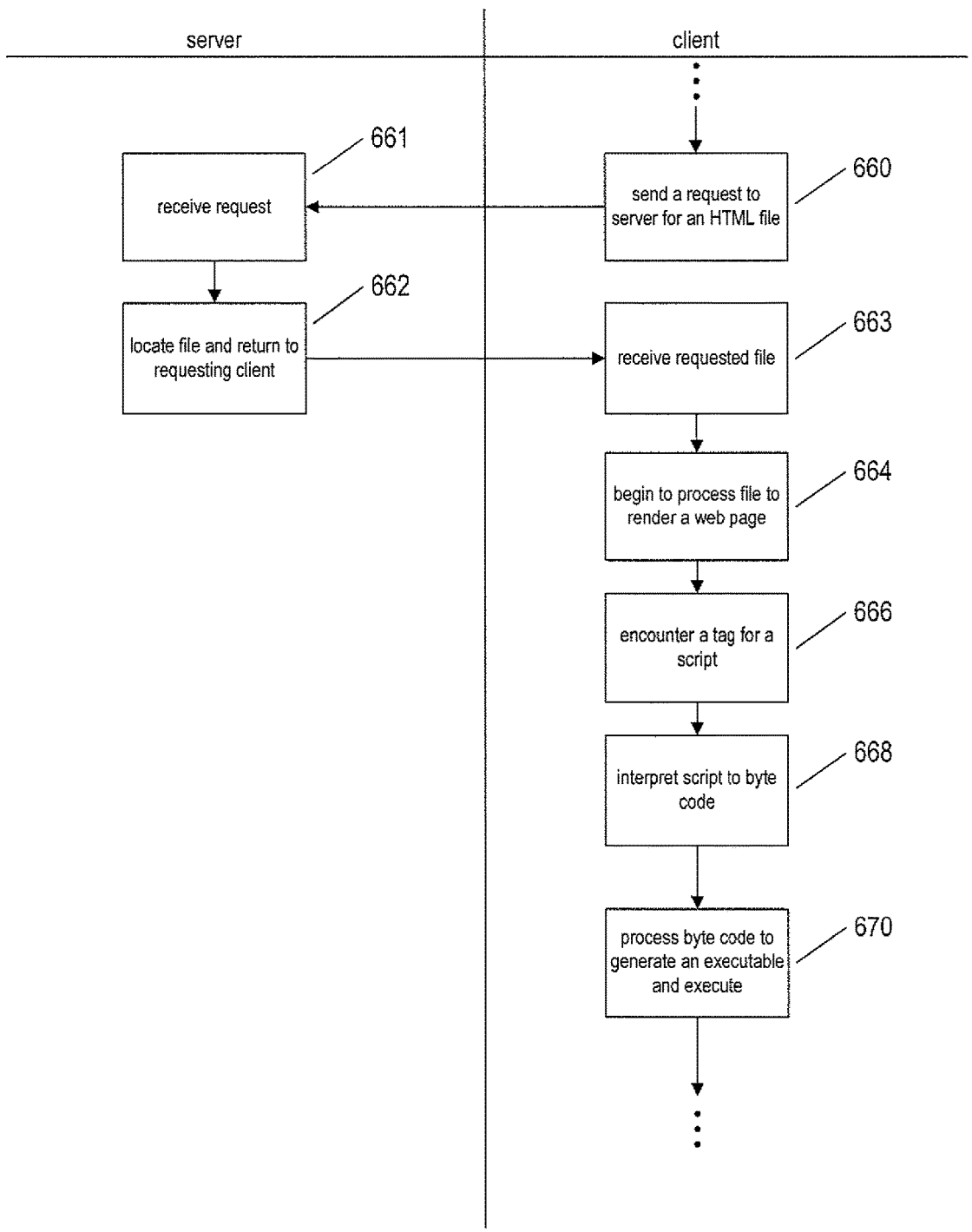

FIG. 6E, using the illustration conventions of FIG. 6C, discussed above, illustrates processing of the HTML file discussed with reference to FIG. 6D. Steps 660-664 in FIG. 6D are identical to the initial steps discussed above with reference to FIG. 6C. In step 666, the client-side web browser encounters a script tag, such as the script tag shown in FIG. 6D 650, while processing a web page for rendering and display. In step 668, the client-side web browser interprets the script-language code embedded in the HTML to generate corresponding byte code. Then, in step 670, the byte code is processed, as in step 646 of FIG. 6C. Note that, in step 668, interpretation of the script embedded in the HTML file may produce program byte code and advice code in the case that the script is advice enhanced. Weaving of advice into program code may occur during interpretation, without or without production of intermediate byte code. Thus, steps 668 and 670 may, in such cases, be combined into a single interpretation step in which the script code is woven and interpreted to execution.

As discussed above, the AOP approach to developing crosscutting functionality within computer programs provides numerous advantages. However, in the client/server environment discussed above with reference to FIGS. 4-6E, when weaving occurs on the client computer, the AOP approach is additionally associated with disadvantages. One disadvantage is that the computational overhead of weaving advice code into program code falls on the client computer, which is often less capable, from the standpoint of computational bandwidth, than the remote server computer from which the program code and advice code is received. Even when the client system is as capable as the server computer with respect to carrying out the weaving process, the client computer generally carries out the weaving process in real time during user interaction with the web browser, as a result of which user-perceptible delays in web-page rendering may occur. Furthermore, when carried out by client-side web browsers, weaving is grossly inefficient both computationally and thermodynamically from the standpoint of the entire distributed system that includes server computers and client computers interconnected by the Internet. As one example, an executable byte-code file may be downloaded to thousands, hundreds of thousands, or millions of client computers, each of which then separately weaves the advice byte code into the program byte code prior to interpreting or executing the woven byte code. This same weaving process is thus carried out in essentially identical fashion thousands, hundreds of thousands, or millions of times. Moreover, the same client computer may repeatedly download a web page, as a result of which the web browser may carry out the same identical weaving task multiple times. Therefore, a frequently distributed HTML encoding of a web page may trigger hundreds of thousands to billions or more identical weaving operations that all produce the same woven code.

Figure 7:
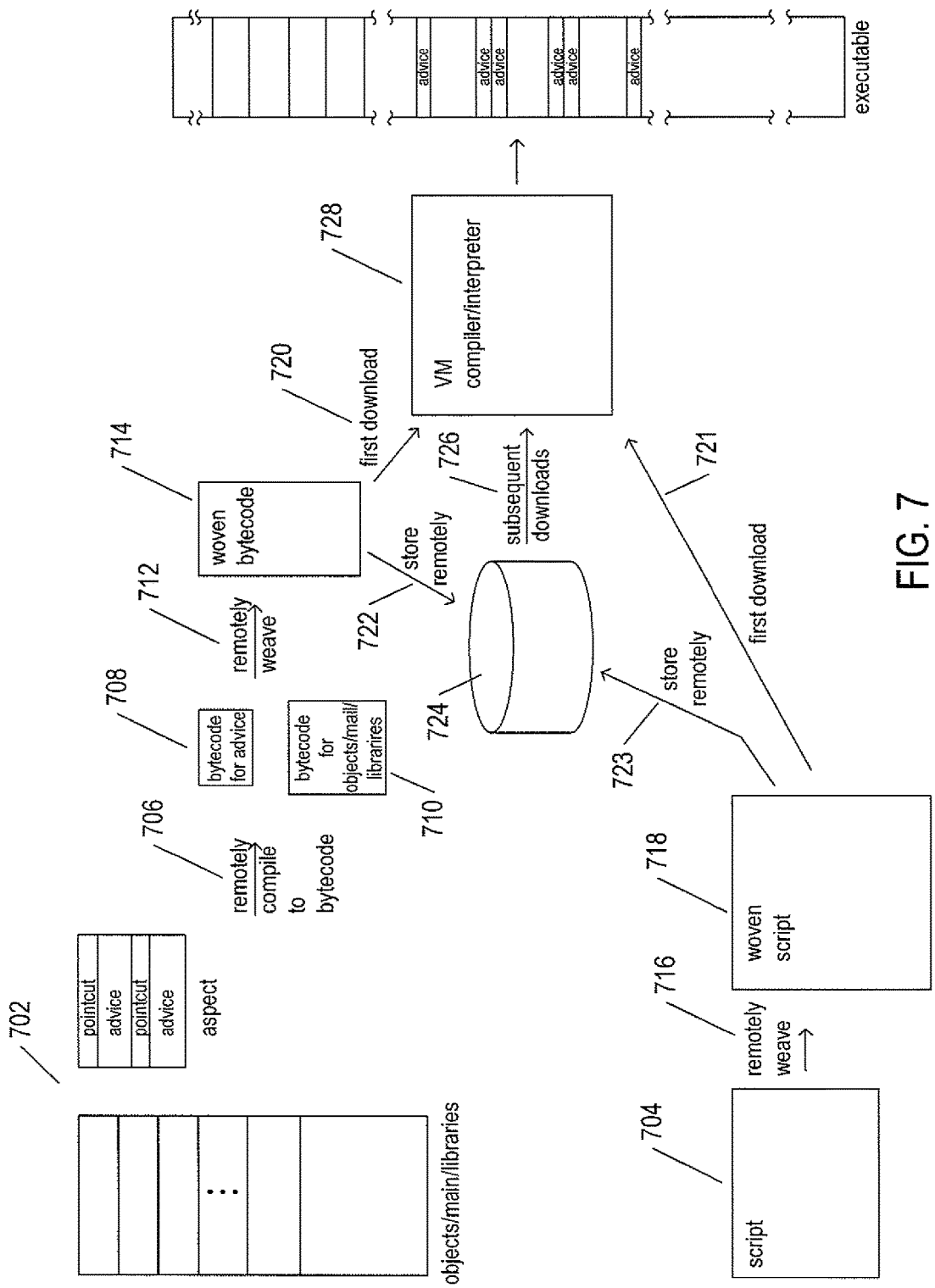
FIG. 7 illustrates a server-side approach to weaving advice into programs and scripts.

FIG. 7 illustrates a server-side approach to weaving advice into programs and scripts. This approach addresses the disadvantages discussed in the preceding paragraph. FIG. 7 uses the same illustration conventions previously used in FIG. 4. As with FIG. 4, FIG. 7 is concerned with program code that includes one or more aspects 702 and a script or script code that includes one or more aspects 704. In the server-side-weaving method to which the current application is directed, aspect-containing program code is remotely compiled to byte code 702 on the server computer to generate byte code for the advice 708 as well as byte code for the program 710 and the advice byte code 708 and program byte code 710 are then remotely woven 712, on the server computer, to generate woven byte code 714. Similarly, aspect-containing script 704 is remotely woven 716 on the server computer to generate woven script 718. The first time that a byte-code file or script-containing file is downloaded by a client computer, the weaving process is carried out by the server and the woven byte code or HTML specification with embedded woven script is then returned to the requesting client computer 720-721 as well as being stored 722-723 in a data-storage facility 724 within the server computer. When the same byte-code file or HTML file with embedded script is subsequently downloaded, the already-woven versions of the file are retrieved from the data-storage facility 724 on the server and returned to the requesting client-side computer 726. Within the client-side computer, a virtual-machine compiler or interpreter 728 can then directly compile or interpret the received woven byte code or woven script without itself undertaking the weaving process.

The client computers that receive files containing scripts and advice remotely woven on the server side recognize that client-side load-time weaving is unnecessary, and therefore do not invoke weaving functionality during script interpretation. Because not all server may employ server-side weaving, the client computers may retain client-side load-time weaving functionality in order to weave script advice into script programs during interpretation when non-woven script programs and associated script advice is received by the client computers.

The server-side weaving method to which the current application is directly clearly addresses the above-described deficiencies and disadvantages of client-side weaving. The weaving process is carried out only once for each HTML file including embedded script code or byte-code file. Of course, when an HTML file including embedded script or a byte-code file is updated or altered, the weaving process may again need to be carried out when the modified or altered file is first downloaded by a client's computer. In certain systems, the server computer may manage the HTML files and byte-code-containing files through a type of versioning system, with digital signatures or embedded time stamps generated for each separate byte-code entity and script entity containing advice. In these systems, the server may maintain indications of whether or not code associated with a particular signature or time stamp has been woven, so that the weaving process is carried out only on particular code that has been modified or altered or newly inserted. At the other extreme, the server may maintain a file store that associates each file with an indication of whether or not the file has been woven and in which any alternation or modification of a file already stored in the file store results in switching the indication from woven to not woven. Intermediate types of systems are also possible. Regardless of the granularity at which the need for weaving is detected, server-side weaving generally decreases the number of weaving operations globally performed by servers and client computers by factors of thousands to billions or more depending on the rate of access of a particular HTML file with embedded script or byte-code file. Note that server-side weaving of script advice into script programs has not been provided, prior to the server-side weaving of script programs disclosed in the current application.

Figure 8A:
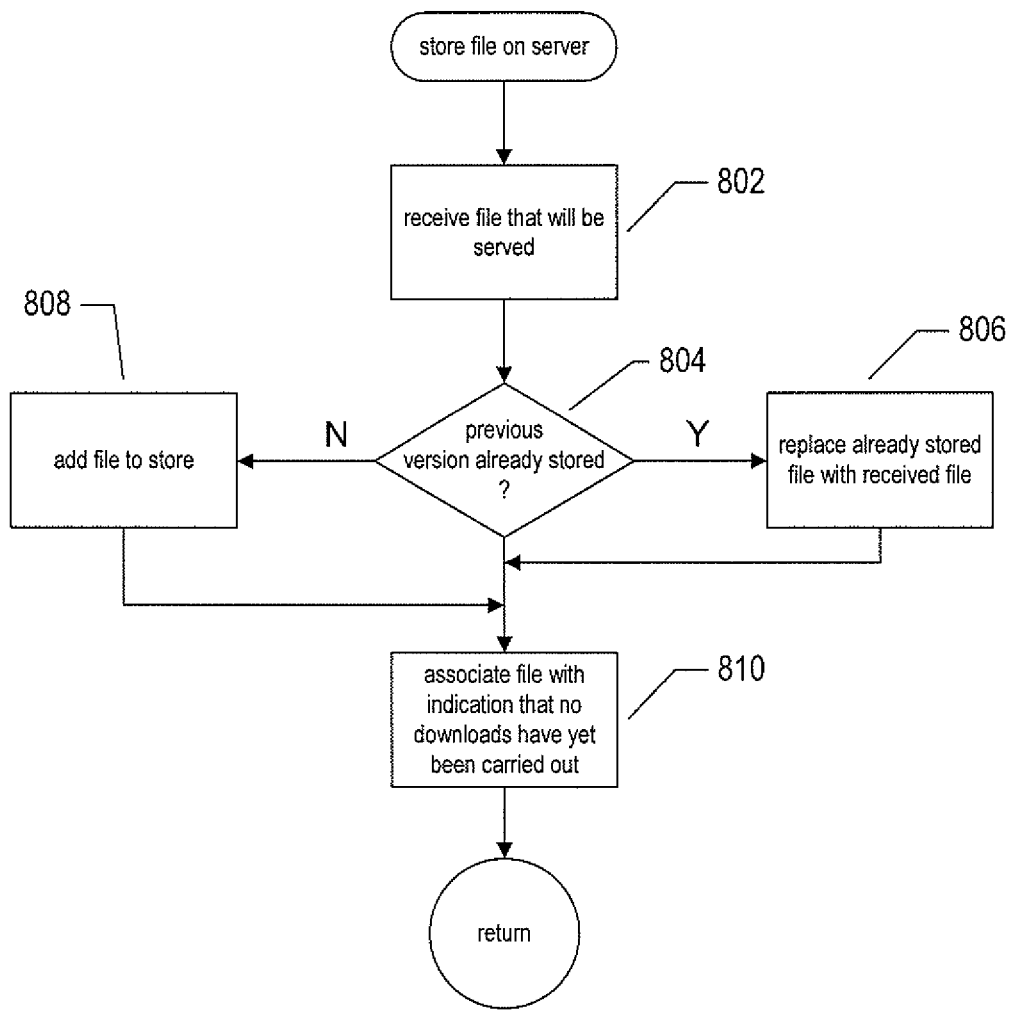
FIGS. 8A-B illustrate, using control-flow diagrams, one implementation of server-side weaving.
Figure 8B:
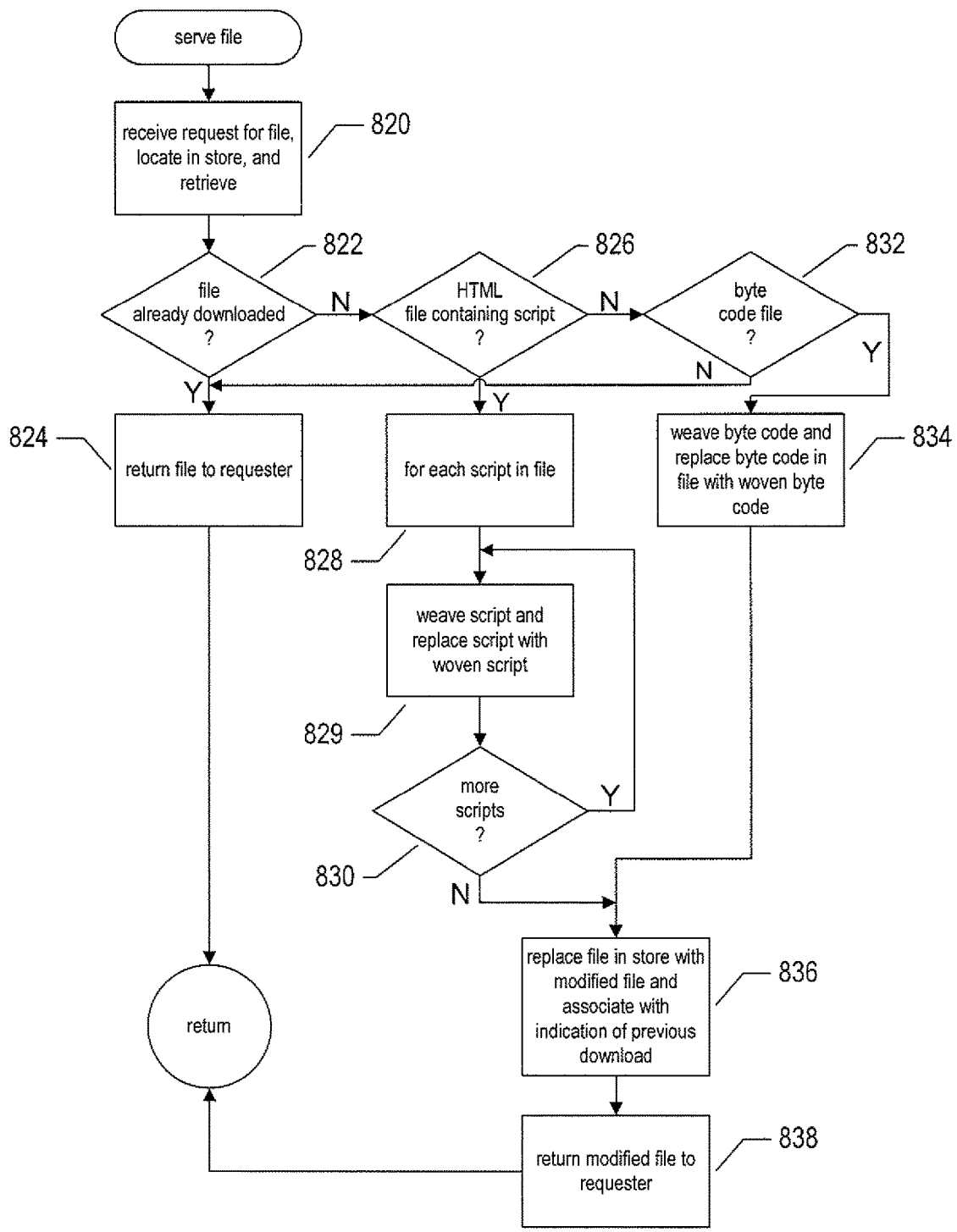

FIGS. 8A-B illustrate, using control-flow diagrams, one implementation of server-side weaving. FIG. 8A illustrates the file-store process on a server that serves the file. In step 802, the server receives a file to be served. When a previous version of the file has already been stored, as determined in step 804, then the server replaces the already stored version of the file with the received file in step 806. Otherwise, the file is added to the file store in step 808. In both cases, the stored file is associated with an indication that no downloads have been carried out with respect to the file, in step 810.

FIG. 8B illustrates the file-serving process on a server that serves a file. In step 820, a server receives a request for a file, locates the file in the file store, and retrieves the file in preparation for returning the file to the requesting client computer. In step 822, the server determines, from an indication associated with the file in the file store, whether the file has already been downloaded. When the file has already been downloaded, the server returns the file to the requesting client computer in step 824. When the file contains either byte code or script code with advice, the advice has already been woven into the byte code or script code. However, when the file has not already been downloaded, then, in the case that the file is an HTML file containing script, as determined in step 826, each script in the file is woven in order to integrate script for advice into the program script in the for-loop of steps 828-830. In the case that the file to be downloaded is a byte-code file, as determined in step 832, then the server weaves advice byte code into program byte code in step 834 and replaces the byte code originally stored in the file with the woven byte code. In both the case of HTML files containing script and byte-code files, the files containing woven code are then used to replace the original files in the file store and the indication associated with the files indicates that the files have been previously downloaded, in step 836. In step 838, the woven file is returned to the requester.

Figure 9:
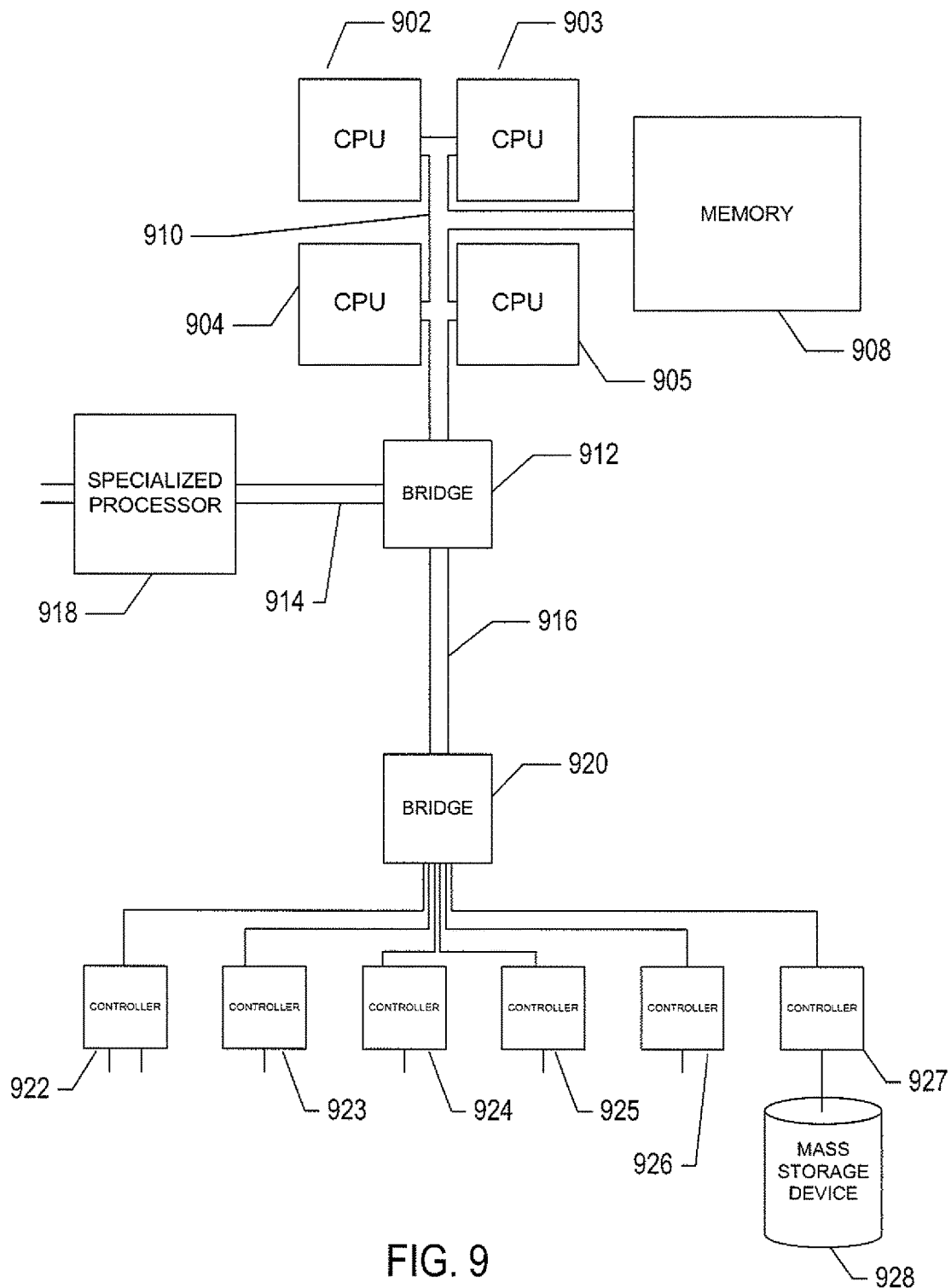
FIG. 9 provides a general architectural diagram for various types of computers.

FIG. 9 provides a general architectural diagram for various types of computers. These computer systems include server computers that carry out server-side weaving and client computers that receive and interpret server-side-woven script programs. The computer system contains one or multiple central processing units ("CPUs") 902-905, one or more electronic memories 908 interconnected with the CPUs by a CPU/memory-subsystem bus 910 or multiple busses, a first bridge 912 that interconnects the CPU/memory-subsystem bus 910 with additional busses 914 and 916, or other types of high-speed interconnection media, including multiple, high-speed serial interconnects. These busses or serial interconnections, in turn, connect the CPUs and memory with specialized processors, such as a graphics processor 918, and with one or more additional bridges 920, which are interconnected with high-speed serial links or with multiple controllers 922-927, such as controller 927, that provide access to various different types of mass-storage devices 928, electronic displays, input devices, and other such components, subcomponents, and computational resources.

Figure 10:
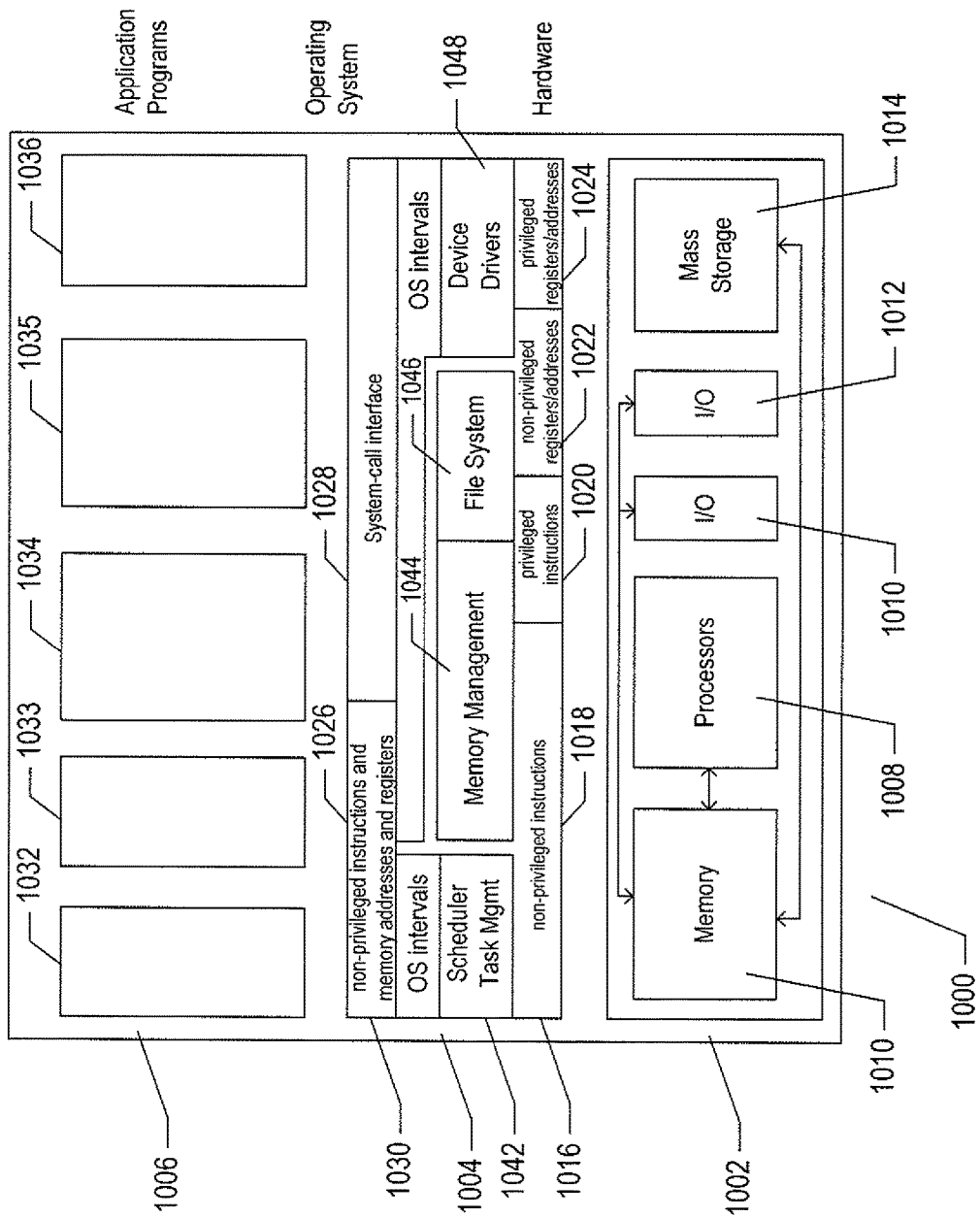
FIG. 10 illustrates generalized hardware and software components of a general-purpose computer system, such as a general-purpose computer system having an architecture similar to that shown in FIG. 8.

FIG. 10 illustrates generalized hardware and software components of a general-purpose computer system, such as a general-purpose computer system having an architecture similar to that shown in FIG. 9. The computer system 1000 is often considered to include three fundamental layers: (1) a hardware layer or level 1002; (2) an operating-system layer or level 1004; and (3) an application-program layer or level 1006. The hardware layer 1002 includes one or more processors 1008, system memory 1010, various different types of input-output ("I/O") devices 1010 and 1012, and mass-storage devices 1014. Of course, the hardware level also includes many other components, including power supplies, internal communications links and busses, specialized integrated circuits, many different types of processor-controlled or microprocessor-controlled peripheral devices and controllers, and many other components. The operating system 1004 interfaces to the hardware level 1002 through a low-level operating system and hardware interface 1016 generally comprising a set of non-privileged processor instructions 1018, a set of privileged processor instructions 1020, a set of non-privileged registers and memory addresses 1022, and a set of privileged registers and memory addresses 1024. In general, the operating system exposes non-privileged instructions, non-privileged registers, and non-privileged memory addresses 1026 and a system-call interface 1028 as an operating-system interface 1030 to application programs 1032-1036 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 1042, memory management 1044, a file system 1046, device drivers 1048, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 1036 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 11:
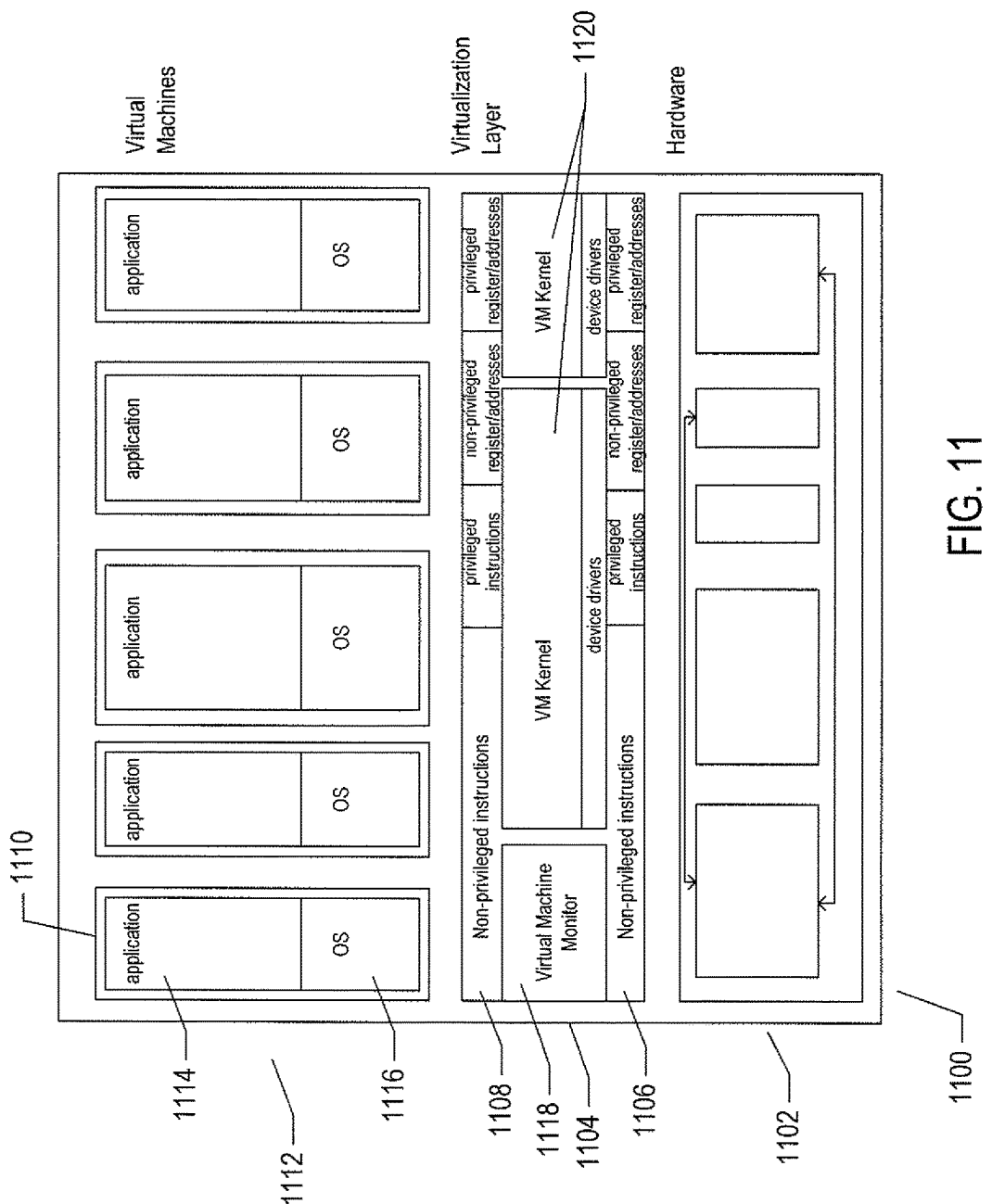
FIG. 11 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 11 illustrates one type of virtual machine and virtual-machine execution environment. FIG. 11 uses the same illustration conventions as used in FIG. 10. In particular, the computer system 1100 in FIG. 11 includes the same hardware layer 1102 as the hardware layer 1002 shown in FIG. 10. However, rather than providing an operating system layer directly above the hardware layer, as in FIG. 10, the virtualized computing environment illustrated in FIG. 11 features a virtualization layer 1104 that interfaces through a virtualization-layer/hardware-layer interface 1106, equivalent to interface 1016 in FIG. 10, to the hardware. The virtualization layer provides a hardware-like interface 1108 to a number of virtual machines, such as virtual machine 1110, executing above the virtualization layer in a virtual-machine layer 1112. Each virtual machine includes one or more application programs or other higher-level computational entities packaged together with an operating system, such as application 1114 and operating system 1116 packaged together within virtual machine 1110. Each virtual machine is thus equivalent to the operating-system layer 1004 and application-program layer 1006 in the general-purpose computer system shown in FIG. 10. Each operating system within a virtual machine interfaces to the virtualization-layer interface 1108 rather than to the actual hardware interface 1106. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 1108 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 1118 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 1108, the accesses result in execution of virtualization-layer code to simulate or emulate the privileged resources. The virtualization layer additionally includes a kernel module 1120 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

A computer program that implements script server-side weaving for distribution of woven script to client computers, according to the methods to which the current application is directed, is included in the Code Appendix.

Although the present invention has been described in terms of particular embodiments, it is not intended that the invention be limited to these embodiments. Modifications within the spirit of the invention will be apparent to those skilled in the art. For example, server-side weaving may be implemented in many different ways by varying any of many different design and implementation parameters, including programming language, underlying operating system, choice of virtual-machine technology, modular organization, data structures, control structures, language syntax, and other such parameters. Advice may be defined and included into many different types of traditional compiled programming languages and script languages by a variety of different methods, syntaxes, and AOP features. The currently described server-side weaving method and systems that incorporate the server-side weaving methods can be adapted to provide server-side weaving for any of the various approaches to including advice into code produced from traditional compiled languages or produced from script. Furthermore, the woven code produced by server-side weaving may be compiled to an executable or interpreted by a client-side virtual-machine compiler or interpreter running within the context of a web browser. In addition, server-side weaving may provide the above mentioned advantages in contexts other than web browsers and client/server-based distribution of computer code. Server-side weaving may be carried out within server applications executing in operating-system-provided execution environments, within server applications running within virtual machines in cloud-computing computational facilities, or in a large variety of additional types of execution environments. It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

CODE APPENDIX

LtwjsFilter.java

```java
import java.io.File;
import java.io.IOException;
import java.net.URL;
import java.util.HashMap;
import java.util.Map;

import javax.servlet.Filter;
import javax.servlet.FilterChain;
import javax.servlet.FilterConfig;
import javax.servlet.ServletContext;
import javax.servlet.ServletException;
import javax.servlet.ServletRequest;
import javax.servlet.ServletResponse;
import javax.servlet.annotation.WebFilter;
import javax.servlet.http.HttpServletRequest;
import javax.servlet.http.HttpServletResponse;

import org.apache.commons.io.Charsets;
import org.apache.commons.io.IOUtils;
import org.apache.commons.logging.Log;
import org.apache.commons.logging.LogFactory;
import org.mozilla.javascript.CompilerEnvirons;
import org.mozilla.javascript.Parser;
import org.mozilla.javascript.ScriptRuntime;
import org.mozilla.javascript.Token;
import org.mozilla.javascript.ast.AstNode;
import org.mozilla.javascript.ast.AstRoot;
import org.mozilla.javascript.ast.Block;
import org.mozilla.javascript.ast.ConditionalExpression;
import org.mozilla.javascript.ast.EmptyStatement;
import org.mozilla.javascript.ast.FunctionCall;
import org.mozilla.javascript.ast.FunctionNode;
import org.mozilla.javascript.ast.KeywordLiteral;
import org.mozilla.javascript.ast.Name;
import org.mozilla.javascript.ast.NodeVisitor;
import org.mozilla.javascript.ast.ObjectLiteral;
import org.mozilla.javascript.ast.ObjectProperty;
import org.mozilla.javascript.ast.PropertyGet;
import org.mozilla.javascript.ast.ReturnStatement;
import org.mozilla.javascript.ast.StringLiteral;
import org.mozilla.javascript.ast.VariableDeclaration;
import org.mozilla.javascript.ast.VariableInitializer;
```

```
/**
 * Servlet filter for JavaScript files which enables program weaving and caches
 * the produced result for further usage. Uses the Mozilla Rhino engine for
 * transforming the script into an Abstract Systax Tree which dramatically
 * simplifies the analysis and the modification of the program.
 *
 * @author Rostislav Hristov
 */
@WebFilter(urlPatterns = { "*.js" })
public class LtwjsFilter implements Filter { private static final String ASPECTS_JS = "/aspects.js";
    private static final Log LOG = LogFactory.getLog(LtwjsFilter.class);

private Map<String, FunctionNode> arounds = new HashMap<String, FunctionNode>();
    private Map<URL, byte[]> files = new HashMap<URL, byte[]>();
    private Map<URL, Long> dates = new HashMap<URL, Long>();
    private ServletContext context;

/**
     * Initializes the filter and reads all the available aspects. Uses a simple
     * JSDoc parser that finds all <code>@around</code> annotations which define
     * the functions that have to be weaved.
     */
    @Override
    public void init(FilterConfig filterConfig) throws ServletException { context = filterConfig.getServletContext();

try {

CompilerEnvirons environs = new CompilerEnvirons();
            environs.setRecordingComments(true);
            environs.setRecordingLocalJsDocComments(true);

AstRoot root = new Parser(environs).parse(IOUtils.toString(
                context.getResource(ASPECTS_JS), Charsets.UTF_8), "", 0);
            root.visit(new NodeVisitor() {
              public boolean visit(AstNode node) {
                if (node instanceof FunctionNode && node.getJsDoc() != null) {
                  AroundParser aroundParser = new AroundParser(node);
                  String around = aroundParser.getAround();
                  if (around != null) {
                    arounds.put(around, (FunctionNode) node);
                  }
                }
```

```
    return true;
  }
});

} catch (IOException e) {
  LOG.error(e.getMessage(), e);
}
}

/**
 * Processes the requested JavaScript program and applies basic weaving to it.
 * Stores the produced result in memory and applies the transformation again only
 * when the original source has been modified.
 */
@Override
public void doFilter(ServletRequest request, ServletResponse response,
    FilterChain chain) throws IOException, ServletException {

HttpServletRequest req = (HttpServletRequest) request;
HttpServletResponse res = (HttpServletResponse) response;

URL url = context
    .getResource(req.getRequestURI().replaceAll("/+", "/"));
File file = new File(url.getFile());
long lastModified = file.lastModified();

if (!files.containsKey(url) || dates.get(url) != lastModified) {

AstRoot root = new Parser().parse(
    IOUtils.toString(url, Charsets.UTF_8), "", 0);
root.visit(new NodeVisitor() { public boolean visit(AstNode node) {

// Iterates through all the available functions and adds support for the following
  // basic definitions:
  // - var functionName = function() {}
  // - function functionName() {}
  if (node instanceof FunctionNode) {

FunctionNode functionNode = (FunctionNode) node;
    String functionName = null;

// Reads the function name
    if (functionNode.getParent() instanceof VariableInitializer) {
      functionName = ((Name) ((VariableInitializer) functionNode
```

```
    .getParent()).getTarget()).getIdentifier();
} else {
  functionName = functionNode.getName();
}

// Checks if the current function has to be weaved and implements a script modification
// that uses the following strategy:
// - creates a clone of the original function
// - inserts a copy of the aspect function
// - replaces the content of the original function with a custom invocation of the
//   aspect function
if (arounds.containsKey(functionName)) {

FunctionNode around = arounds.get(functionName);
  String cloneName = "__" + functionName + "__";

if (functionNode.getParent() instanceof VariableInitializer) {

FunctionNode aroundClone = new FunctionNode();
    aroundClone.setFunctionType(around
        .getFunctionType());
    aroundClone.setParams(around.getParams());
    aroundClone.setBody(around.getBody());

VariableInitializer aroundInitializer = new VariableInitializer();
    aroundInitializer.setTarget(new Name(-1, around
        .getName()));
    aroundInitializer.setInitializer(aroundClone);

VariableDeclaration aroundDeclaration = new VariableDeclaration();
    aroundDeclaration
        .addVariable(aroundInitializer);
    aroundDeclaration
        .setType(((VariableDeclaration) node
          .getParent().getParent())
          .getType());

node.getParent()
      .getParent()
      .getParent()
      .addChildBefore(aroundDeclaration,
          node.getParent().getParent());
    node.getParent()
      .getParent()
      .getParent()
      .addChildBefore(new EmptyStatement(),
```

```
    node.getParent().getParent());

FunctionNode functionClone = new FunctionNode();
functionClone.setFunctionType(functionNode
    .getFunctionType());
functionClone.setParams(functionNode
    .getParams());
functionClone.setBody(functionNode.getBody());

VariableInitializer functionInitializer = new VariableInitializer();
functionInitializer.setTarget(new Name(-1,
    cloneName));
functionInitializer
    .setInitializer(functionClone);

VariableDeclaration functionDeclaration = new VariableDeclaration();
functionDeclaration
    .addVariable(functionInitializer);
functionDeclaration
    .setType(((VariableDeclaration) node
        .getParent().getParent())
        .getType());

node.getParent()
   .getParent()
   .getParent()
   .addChildBefore(functionDeclaration,
       node.getParent().getParent());
node.getParent()
   .getParent()
   .getParent()
   .addChildBefore(new EmptyStatement(),
       node.getParent().getParent());

} else {

FunctionNode aroundClone = new FunctionNode(-1,
    new Name(-1, around.getName()));
aroundClone.setFunctionType(around
    .getFunctionType());
aroundClone.setParams(around.getParams());
aroundClone.setBody(around.getBody());
node.getParent().addChildBefore(aroundClone,
    node);
node.getParent().addChildBefore(
    new EmptyStatement(), node);
```

```
    FunctionNode functionClone = new FunctionNode(
        -1, new Name(-1, cloneName));
    functionClone.setFunctionType(functionNode
        .getFunctionType());
    functionClone.setParams(functionNode
        .getParams());
    functionClone.setBody(functionNode.getBody());
    node.getParent().addChildBefore(functionClone,
        node);
    node.getParent().addChildBefore(
        new EmptyStatement(), node);
}

KeywordLiteral thisLiteral = new KeywordLiteral(-1,
    1, Token.THIS);
Name argsName = new Name(-1, "args");
Name closureName = new Name(-1, "closure");
Name targetName = new Name(-1, "target");

ObjectLiteral obj = new ObjectLiteral();

ObjectProperty signature = new ObjectProperty();
signature.setLeft(new Name(-1, "signature"));
StringLiteral signatureValue = new StringLiteral();
signatureValue.setQuoteCharacter('\"');
signatureValue.setValue(functionName);
signature.setRight(signatureValue);
obj.addElement(signature);

ObjectProperty target = new ObjectProperty();
target.setLeft(targetName);
target.setRight(thisLiteral);
obj.addElement(target);

ObjectProperty closure = new ObjectProperty();
closure.setLeft(closureName);
closure.setRight(new Name(-1, cloneName));
obj.addElement(closure);

ObjectProperty args = new ObjectProperty();
args.setLeft(argsName);
FunctionCall argsValue = new FunctionCall();
argsValue.setTarget(new PropertyGet(
    new PropertyGet(new PropertyGet(new Name(
        -1, "Array"), new Name(-1,
```

```
        "prototype")),
    new Name(-1, "slice")), new Name(
    -1, "call")));
argsValue.addArgument(new Name(-1, "arguments"));
args.setRight(argsValue);
obj.addElement(args);

ObjectProperty proceed = new ObjectProperty();
proceed.setLeft(new Name(-1, "proceed"));
FunctionNode proceedValue = new FunctionNode();
proceedValue.addParam(argsName);
FunctionCall proceedValueCall = new FunctionCall();
proceedValueCall.setTarget(new PropertyGet(
    new PropertyGet(thisLiteral, closureName),
    new Name(-1, "apply")));
proceedValueCall.addArgument(new PropertyGet(
    thisLiteral, targetName));
ConditionalExpression ce = new ConditionalExpression();
ce.setTestExpression(argsName);
ce.setTrueExpression(argsName);
ce.setFalseExpression(new PropertyGet(thisLiteral,
    argsName));
proceedValueCall.addArgument(ce);
ReturnStatement proceedValueReturn = new ReturnStatement();
proceedValueReturn.setReturnValue(proceedValueCall);

Block proceedValueBody = new Block();
proceedValueBody.addChild(proceedValueReturn);

proceedValue.setBody(proceedValueBody);

proceed.setRight(proceedValue);
obj.addElement(proceed);

FunctionCall call = new FunctionCall();
call.setTarget(new Name(-1, arounds.get(
    functionName).getName()));
call.addArgument(obj);

ReturnStatement statement = new ReturnStatement();
statement.setReturnValue(call);

Block body = new Block();
body.addChild(statement);

functionNode.setBody(body);
```

```
          }
        } return true;
      }
    });

// Stores the result of the weaving transformation
    files.put(url, root.toSource().getBytes(Charsets.UTF_8));
    dates.put(url, lastModified);

}

// Applies common response headers
  String etag = "W/\"" + file.length() + "-" + lastModified + "\"";
  res.setHeader("ETag", etag);

String ifNoneMatch = req.getHeader("If-None-Match");
  long ifModifiedSince = req.getDateHeader("If-Modified-Since");

if ((ifNoneMatch != null && ifNoneMatch.equals(etag))
      || (ifModifiedSince != -1 && lastModified < ifModifiedSince + 1000)) {
    res.setStatus(HttpServletResponse.SC_NOT_MODIFIED);
    return;
  } byte[] content = files.get(url);
  res.setContentLength(content.length);
  res.setContentType("application/javascript");
  res.setDateHeader("Last-Modified", lastModified);
  res.setHeader("Accept-Ranges", "bytes");
  res.getOutputStream().write(content);
  res.getOutputStream().flush();
  res.getOutputStream().close();
}

@Override
public void destroy() {
}

}
``` aspects.js

```
/**
 * Weaves the printing implementation.
 * @around print
 */
function aroundPrint(joinPoint) {
        console.info("begin print");
        joinPoint.proceed(["@around " + joinPoint.args[0]]);
        console.info("end print");
};

/**
 * Weaves the hello function.
 * @around hello
 */
function aroundHello(joinPoint) {
        console.info("begin hello");
        var result = joinPoint.proceed();
        console.info("end hello");
        return result;
};
```

An example program that is to be woven by the above-provided weaving method is next provided:

application.js
```
function print(str) {
        console.info(str);
};

var hello = function() {
        return "hello world";
};

function foo() {
        return "blah";
};
```

The woven example program is provided below:

Weaved application.js
```
function aroundPrint(joinPoint) {
```

```
console.info("begin print");
joinPoint.proceed(["@around " + joinPoint.args[0]]);
console.info("end print");
}
;
function __print__(str) {
  console.info(str);
}
;
function print(str) {
  return aroundPrint({signature: 'print', target: this, closure: __print__, args: Array.prototype.slice.call(arguments), proceed: function(args) {
    return this.closure.apply(this.target, args ? args : this.args);
}});
}
;
var aroundHello = function(joinPoint) {
  console.info("begin hello");
  var result = joinPoint.proceed();
  console.info("end hello");
  return result;
}
;
var __hello__ = function() {
  return "hello world";
};
var hello = function() {
  return aroundHello({signature: 'hello', target: this, closure: __hello__, args: Array.prototype.slice.call(arguments), proceed: function(args) {
    return this.closure.apply(this.target, args ? args : this.args);
}});
};
function foo() {
  return "blah";
}
;
```

The invention claimed is:

1. A server system comprising:
one or more processors;
one or more memories;
one or more mass-storage devices;
communications subsystems that receive requests for files from remote client computers and transmit requested files to client computers;
a weaver that weaves a script program and one or more script aspects into a woven script program;
a server application that, upon receiving a first request for a file containing a script program with associated script advice,
   uses the weaver to weave the script program and script advice together to produce a corresponding woven script program,
   replaces the script program with associated script advice in the file with the corresponding woven script program,
   stores the file containing the corresponding woven script program in one or more of the one or more memories and one or more mass-storage devices, and
   transmits the file containing the corresponding woven script program through the communications subsystems.

2. The server system of claim 1 further including:
when the server application, upon receiving a request for the file containing the script program other than the first request,
   retrieves the file containing the corresponding woven script program from the one or more of the one or more memories and one or more mass-storage devices, and
   transmits the file containing the corresponding woven script program through the communications subsystems.

3. The server system of claim 1 wherein the server system further includes a file-versioning subsystem that manages updates made to files and stores updated files as new versions and wherein receiving a first request for a file containing a script program further comprises receiving a first request for a particular version of a file containing a script program.

4. The server system of claim 1 wherein the file containing the script program is a file that specifies the contents of a web browser.

5. The server system of claim 1 wherein the server application uses the weaver to weave the script program and script advice together to produce a corresponding woven script program without interpreting or compiling the script program to an executable form.

6. A method carried out in a server system that includes one or more processors, one or more memories, one or more mass-storage devices, and communications subsystems that receive requests for files from remote client computers and transmit requested files to client computers, the method comprising:
receiving, by a server application, a first request for a file containing a script program with associated script advice;
weaving the script program and script advice together to produce a corresponding woven script program;
replacing the script program with associated script advice in the file with the corresponding woven script program;
storing the file containing the corresponding woven script program in one or more of the one or more memories and one or more mass-storage devices; and
transmitting the file containing the corresponding woven script program through the communications subsystems.

7. The method of claim 6 further including:
receiving, by the server application, a request for the file containing the script program other than the first request,
retrieving the file containing the corresponding woven script program from the one or more of the one or more memories and one or more mass-storage devices, and
transmitting the file containing the corresponding woven script program through the communications subsystems.

8. The method of claim 6 wherein the server system further includes a file-versioning subsystem that manages updates made to files and stores updated files as new versions and wherein receiving a first request for a file containing a script program further comprises receiving a first request for a particular version of a file containing a script program.

9. The method of claim 6 wherein the file containing the script program is a file that specifies the contents of a web browser.

10. The method of claim 6 wherein a client system that includes one or more processors, one or more memories, and communications subsystems that receive files requested from remote server computers and transmit requests for files to server computers and further including:
requesting, by a file-rendering application executing on the client computer, a file containing a script program with associated script advice from the server computer; and
when the script program with associated advice has been remotely woven on the server computer, interpreting, by the file-rendering application executing on the client computer, the script program with associated script without weaving the associated script advice into the script program.

11. The method of claim 10 wherein, when the script program with associated advice has not been remotely woven on the server computer, weaving, by the file-rendering application, the associated script advice into the script program prior to or during interpretation of the script program with associated script advice.

12. The method of claim 6 wherein weaving the script program and script advice together to produce a corresponding woven script program does not include interpreting or compiling the script program to an executable form.

* * * * *